US010425702B2

(12) United States Patent
Trainor et al.

(10) Patent No.: US 10,425,702 B2
(45) Date of Patent: Sep. 24, 2019

(54) SENSOR PACKS THAT ARE CONFIGURED BASED ON BUSINESS APPLICATION

(71) Applicant: Sensormatic Electronics, LLC, Westford, MA (US)

(72) Inventors: Christine Trainor, Boca Raton, FL (US); David Vavrasek, Westfield, NJ (US)

(73) Assignee: Sensormatic Electronics, LLC, Westford, MA (US)

( * ) Notice: Subject to any disclaimer, the term of this patent is extended or adjusted under 35 U.S.C. 154(b) by 163 days.

(21) Appl. No.: 14/870,493

(22) Filed: Sep. 30, 2015

(65) Prior Publication Data
US 2017/0094376 A1    Mar. 30, 2017

(51) Int. Cl.
*H04Q 9/00* (2006.01)
*G06Q 10/00* (2012.01)
*G06Q 40/08* (2012.01)
*G08B 31/00* (2006.01)

(52) U.S. Cl.
CPC .............. *H04Q 9/00* (2013.01); *G06Q 10/00* (2013.01); *G06Q 40/08* (2013.01); *G08B 31/00* (2013.01); *H04Q 2209/823* (2013.01)

(58) Field of Classification Search
None
See application file for complete search history.

(56) References Cited

U.S. PATENT DOCUMENTS 5,825,283 A    10/1998  Camhi
8,650,048 B1    2/2014  Hopkins et al.
2001/0039525 A1  11/2001  Messmer et al.
2002/0067259 A1   6/2002  Fufidio et al.
2002/0161609 A1  10/2002  Zizzamia et al.
2003/0083756 A1   5/2003  Hsiung et al.
2003/0117279 A1   6/2003  Ueno et al.
2005/0055249 A1   3/2005  Helitzer et al.
2005/0068165 A1   3/2005  Kelliher et al.
2006/0033625 A1   2/2006  Johnson et al.
2006/0195569 A1   8/2006  Barker et al.
2007/0061023 A1   3/2007  Hoffberg et al.
2007/0085690 A1   4/2007  Tran
2007/0282773 A1  12/2007  Harrison et al.
2008/0065427 A1   3/2008  Helitzer et al.

(Continued)

OTHER PUBLICATIONS

CSC2515 Fall 2007 Introduction to Machine Learning, Lecture 10: Sequential Data Models, Fall 2007.

(Continued)

*Primary Examiner* — Ryan W Sherwin
*Assistant Examiner* — Shawna M Kingston
(74) *Attorney, Agent, or Firm* — Foley & Lardner LLP

(57) ABSTRACT

Techniques for detecting physical conditions at a physical premises from collection of sensor information from plural sensors execute one or more unsupervised learning models to continually analyze the collected sensor information to produce operational states of sensor information, produce sequences of state transitions, detect during the continual analysis of sensor data that one or more of the sequences of state transitions is a drift sequence, correlate determined drift state sequence to a stored determined condition at the premises, and generate an alert based on the determined condition. Various uses are described for these techniques.

15 Claims, 25 Drawing Sheets

(56) References Cited

U.S. PATENT DOCUMENTS

| | | |
|---|---|---|
| 2008/0294690 A1 | 11/2008 | McClellan et al. |
| 2009/0265193 A1 | 10/2009 | Collins et al. |
| 2009/0279734 A1 | 11/2009 | Brown |
| 2010/0094661 A1 | 4/2010 | Karlinski et al. |
| 2010/0134285 A1 | 6/2010 | Holmquist |
| 2010/0153140 A1 | 6/2010 | Helitzer et al. |
| 2012/0086550 A1 | 4/2012 | Leblanc et al. |
| 2012/0226652 A1 | 9/2012 | Gupta et al. |
| 2013/0006676 A1 | 1/2013 | Helitzer et al. |
| 2013/0027561 A1 | 1/2013 | Lee et al. |
| 2013/0057405 A1 | 3/2013 | Seelman et al. |
| 2013/0066592 A1 | 3/2013 | Aupetit et al. |
| 2013/0218603 A1 | 8/2013 | Hagelstein et al. |
| 2013/0307682 A1 | 11/2013 | Jerhotova et al. |
| 2014/0313032 A1 | 10/2014 | Sager et al. |
| 2015/0025917 A1 | 1/2015 | Stempora |
| 2015/0077737 A1* | 3/2015 | Belinsky ............ G01N 15/0211 356/51 |
| 2015/0154715 A1 | 6/2015 | Wedig et al. |
| 2015/0187192 A1 | 7/2015 | Tabe |
| 2016/0110833 A1 | 4/2016 | Fix et al. |
| 2016/0163186 A1 | 6/2016 | Davidson et al. |
| 2016/0171618 A1 | 6/2016 | Besman et al. |
| 2016/0189510 A1 | 6/2016 | Hutz |
| 2017/0004226 A1 | 1/2017 | Skoglund et al. |
| 2017/0091867 A1 | 3/2017 | Trainor et al. |
| 2017/0091868 A1 | 3/2017 | Trainor et al. |
| 2017/0091869 A1 | 3/2017 | Trainor et al. |
| 2017/0091870 A1 | 3/2017 | Trainor et al. |
| 2017/0091871 A1 | 3/2017 | Trainor et al. |
| 2017/0092108 A1 | 3/2017 | Trainor et al. |
| 2017/0094376 A1 | 3/2017 | Trainor et al. |
| 2017/0301030 A1 | 10/2017 | Wedig et al. |

OTHER PUBLICATIONS

International Search Report and Written Opinion, PCT/US16/54312.
International Search Report and Written Opinion, PCT/US16/54324.
International Search Report and Written Opinion, PCT/US16/54317.
Machine learning algorithms for Real Data Sources, Monteleoni, 46 pages, Feb. 2011.
Office Action for U.S. Appl. No. 14/870,341, dated Dec. 19, 2017, 12 pages.
Office Action for U.S. Appl. No. 14/870,341, dated Jul. 31, 2018, 14 pages.
Office Action for U.S. Appl. No. 14/870,341, dated May 8, 2017, 12 pages.
Office Action for U.S. Appl. No. 14/870,341, dated Oct. 20, 1016, 12 pages.
Office Action for U.S. Appl. No. 14/870,463, dated Jul. 25, 2018, 43 pages.
Office Action for U.S. Appl. No. 14/870,621, dated Jul. 20, 2018, 18 pages.
Statistical Learning Algorithms Applied to Automobile Insurance Ratemaking by Dugas et al, 60 pages.
Unsupervised Learning by Ghahramani, 32 pages, Sep. 2004.
"Unsupervised Hierarchical Modeling of Driving Behavior and Prediction of Contextual Changing Points," IEEE Transactions on Intelligent Transportation Systems, vol. 16, No. 4, Aug. 2015, 35 pages.
Datta, Somnath. "Learn More About Unsupervised Learning," Informatics for Materials Science and Engineering, 21 pages, 2013.
Final Office Action on U.S. Appl. No. 14/870,463 dated Feb. 7, 2019.
Final Office Action on U.S. Appl. 14/870,621 dated Feb. 12, 2019.
Marxer [et al.,] "Unsupervised Incremental Learning and Prediction of Audio Signals," Proceedings of 20th International Symposium on Music Acoustics, 8 pages, Aug. 2010.
Rosenberg, Jerry M. Dictionary of Computers, Information Processing, and Telecommunications, 2 ed., John Wiley & Sons, 2 pages, 1990.
Taniguchi [et al.,] "Semiotic Prediction of Driving Behavior using Unsupervised Double Articulation Analyzer," 2012 Intelligent Vehicles Symposium, 6 pages, Jun. 2012.

* cited by examiner

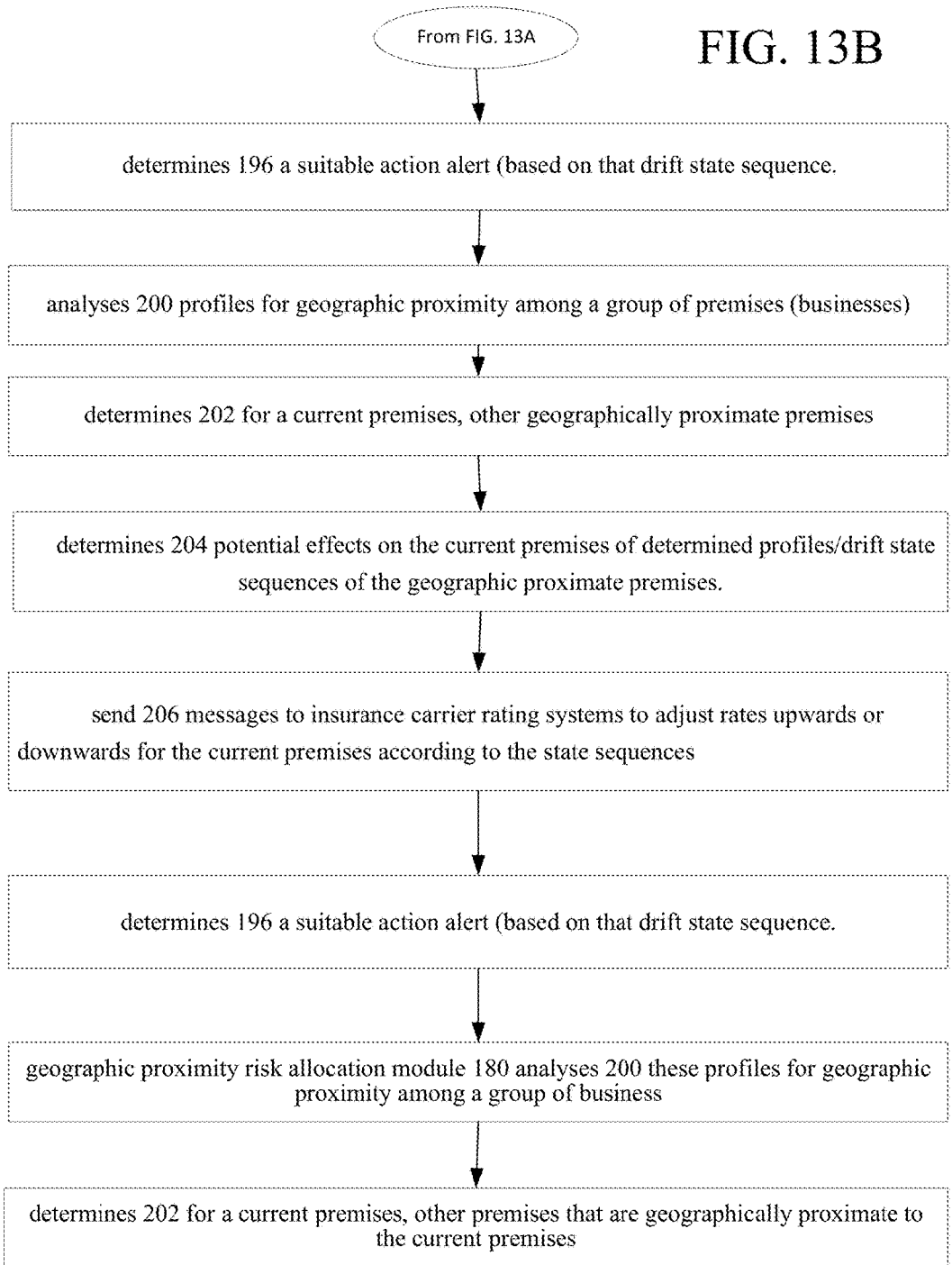

| Premises: | ID | | | |
|---|---|---|---|---|
| System: | ID | | | |

| Historical state transitions |
|---|
| s1 s2 s4 s5 s3 |
| s1 s2 s4 s5 |
| s2 s2 s4 s5 |

| Ob. Detector | Room Thermostat | Stove Thermostat | Safety State |
|---|---|---|---|
| 0 | 71.1755732 | 78.95655605 | G |
| 0 | 68.27180645 | 79.97821825 | G |
| | * | | |
| | * | | |
| | * | | |
| 1 | 70.23391637 | 81.80212485 | Y |
| 0 | 68.19244768 | 81.19203004 | G |
| | * | | |
| | * | | |
| | * | | |

| Historical service records | | | |
|---|---|---|---|
| Job No. | Job Cause No. | Resolution No. | Comments |
| | * | | |
| | * | | |
| | * | | |

FIG. 14A

SENSOR PACKS THAT ARE CONFIGURED BASED ON BUSINESS APPLICATION

BACKGROUND

This description relates to operation of sensor networks such as those used for security, intrusion and alarm systems installed on industrial or commercial or residential premises.

It is common for businesses to have various types of systems such as intrusion detection, fire detection and surveillance systems for detecting various alarm conditions at their premises and signaling the conditions to a monitoring station or authorized users. Other systems that are commonly found in businesses are access control systems have card readers and access controllers to control access, e.g., open or unlock doors, etc. These systems use various types of sensors such as motion detectors, cameras, and proximity sensors, thermal, optical, vibration sensors and so forth.

SUMMARY

Companies develop, deploy, monitor and service various types of such equipment for controlling access to and protecting of physical premises, such as fire protection products, intrusion products, video surveillance products, access control products, etc. Those products typically are accessed via a dedicated panel that resides in the building or via a remote application such as on a mobile device. The data regarding how the product is being used is saved, but that data only resides in the product's memory or in a related electronic log. For example, information regarding when a user turns on their intrusion system, or which zones that they bypass is only recorded in the physical system. Likewise, information regarding how and when the system is serviced is only kept by the owner of the equipment and by the servicing company.

Such data records contain valuable information that is typically used for a very limited number of purposes. Described herein is a system that mines accumulated data and geographically related data to produce predictions with respect to a risk level that either equipment or a user's actions relative to the equipment pose to the premises and/or the equipment.

According to an aspect, a computer program product tangibly stored on a computer readable hardware storage device for detecting conditions at a physical premises, the computer program product includes instructions to cause a processor to collect sensor information from plural groups of sensors that are comprised of various plural types of sensors, and which groups of sensors are deployed in a plurality of specific types of premises, execute one or more unsupervised learning models to continually analyze the collected sensor information to produce operational states of sensor information, produce sequences of state transitions from the operational states of sensor information, continually analyze the collected sensor information by the one or more unsupervised learning models to determine for each of the specific premises from the collected sensor information for each of the deployed sensor groups safe sensor state sequences and unsafe sensor state sequences, determine empirically characteristics of each premises during the detected unsafe sensor state sequences detected during the continual analysis, produce alerts based on the determine empirically characteristics, and determine from the plural generated states which of the sensors contribute to the generated alerts.

Aspects also include systems and methods.

Additional features of the computer program product, systems and methods may include these and other features. Aspects include to classify the determined sensors as a sensor pack for the premises type. The specific configuration of sensor packs is determined for the business segment. For each business segment the program determines which sensor data is more relevant to detection of specific anomalies than other sensors data according to execution of the machine learning unsupervised algorithms. The aspects determine which of plural groups of sensors deployed are relevant for specific types of equipment and determine which of the plural groups of sensors deployed are relevant for monitoring the general environment of the specific type of premises.

A manner for handling sensor monitoring is by use of sensor packs. The concept of a sensor pack uses the processing concepts as applied to individual business types and/or individual business areas. A sensor pack is thus provided as a pre-packaged group of sensors that have two or more different sensor elements to sense correspondingly two or more different properties, which is configured according to results of risk analysis based on specific business application process. These aspects can introduce the advantages of standardization of sensor types into various specific configurations of sensor device as sensor packs that are deployed for specific applications and specific business types.

The details of one or more embodiments of the invention are set forth in the accompanying drawings and the description below. Other features, objects, and advantages of the invention is apparent from the description and drawings, and from the claims.

DESCRIPTION OF DRAWINGS

FIG. 4A is a diagram depicting a conventional arrangement for access control.

FIGS. 13A-13B is a flow diagram of an example of sensor based proximity risk allocation.

FIG. 14A is a block diagram of an exemplary format of supplemental data to augment a claim form.

DETAILED DESCRIPTION

Described herein are surveillance/intrusion/fire/access systems that are wirelessly connected to a variety of sensors. In some instances those systems maybe wired to sensors. Examples of detectors/sensors 28 (sensor detectors used interchangeably) include motion detectors, glass break detectors, noxious gas sensors, smoke/fire detectors, contact/proximity switches, video sensors, such as camera, audio sensors such as microphones, directional microphones, temperature sensors such as infrared sensors, vibration sensors, air movement/pressure sensors, chemical/electro-chemical sensors, e.g., VOC (volatile organic compound) detectors. In some instances, those systems sensors may include weight sensors, LIDAR (technology that measures distance by illuminating a target with a laser and analyzing the reflected light), GPS (global positioning system) receivers, optical, biometric sensors, e.g., retina scan sensors, EGG/Heartbeat sensors in wearable computing garments, network hotspots and other network devices, and others.

The surveillance/intrusion/fire/access systems employ wireless sensor networks and wireless devices, with remote, cloud-based server monitoring and report generation. As described in more detail below, the wireless sensor networks wireless links between sensors and servers, with the wireless links usually used for the lowest level connections (e.g., sensor node device to hub/gateway).

In the network, the edge (wirelessly-connected) tier of the network is comprised sensor devices that provide specific sensor functions. These sensor devices have a processor and memory, and may be battery operated and include a wireless network card. The edge devices generally form a single wireless network in which each end-node communicates directly with its parent node in a hub-and-spoke-style architecture. The parent node may be, e.g., a network access point (not to be confused with an access control device or system) on a gateway or a sub-coordinator which is, in turn is connected to the access point or another sub-coordinator.

Figure 1:
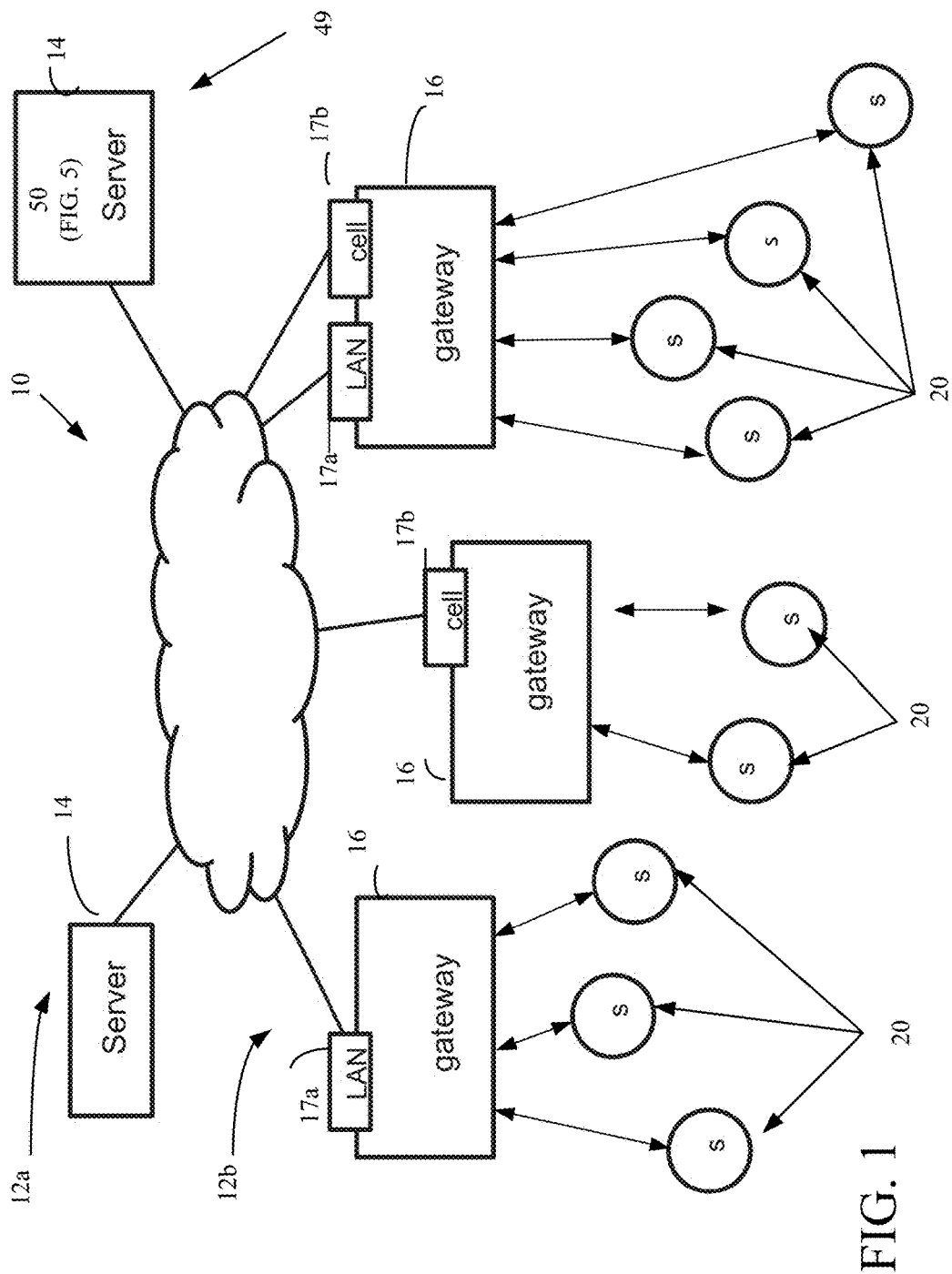
FIG. 1 is a schematic diagram of an exemplary networked security system.

Referring now to FIG. 1, an exemplary (global) distributed network topology for a wireless sensor network 10 is shown. In FIG. 1 the wireless sensor network 10 is a distributed network that is logically divided into a set of tiers or hierarchical levels 12a-12c.

In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

In one implementation hierarchical level 12a includes a central monitoring station 49 comprised of one or more of the server computers 14 and which includes or receives information from a sensor based state prediction system 50 as will be described below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F"), as well as wireless sensor nodes or sensor end-nodes 20 (marked in the FIG. 1 with "C"). In some embodiments wired sensors (not shown) can be included in aspects of the distributed network 10.

In a typical network, the edge (wirelessly-connected) tier of the network is largely comprised of devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional sensor node or "F" sensor node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

In some instances the sensors 20 are sensor packs (discussed below), which are configured for a particular types of business applications, whereas in other implementations the sensors are found in installed systems such as the example security systems discussed below.

Figure 2:
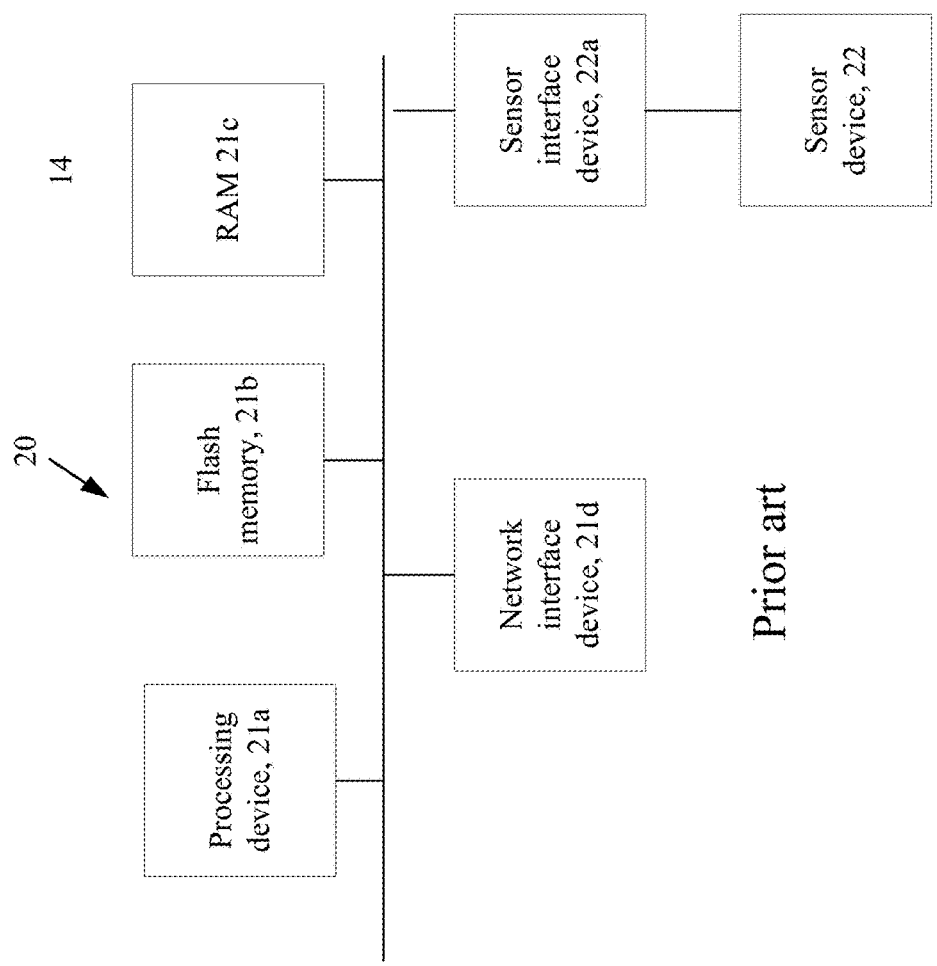
FIG. 2 is a block diagram of a sensor.

Referring to FIG. 2, a sensor device 20 is shown. Sensor device 20 includes a processor device 21a, e.g., a CPU and or other type of controller device that executes under an operating system, generally with 8-bit or 16-bit logic, rather than the 32 and 64-bit logic used by high-end computers and microprocessors. The device 20 has a relatively small flash/persistent store 21b and volatile memory 21c in comparison with other the computing devices on the network. Generally the persistent store 21b is about a megabyte of storage or less and volatile memory 21c is about several kilobytes of RAM memory or less. The device 20 has a network interface card 21d that interfaces the device 20 to the network 10. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The device 20 also includes a sensor element 22 and a sensor interface 22a that interfaces to the processor 21a. Sensor 22 can be any type of sensor types mentioned above.

In some implementations, a pre-set suite of fixed/mobile sensor packs (discussed below) are used. These pre-set suite(s) of fixed/mobile sensor packs are especially selected for particular applications according to processing that is discussed below. In any event, either individual sensors conventionally deployed throughout a premises or one or more pre-set suite of fixed/mobile sensor packs are used.

Figure 3:
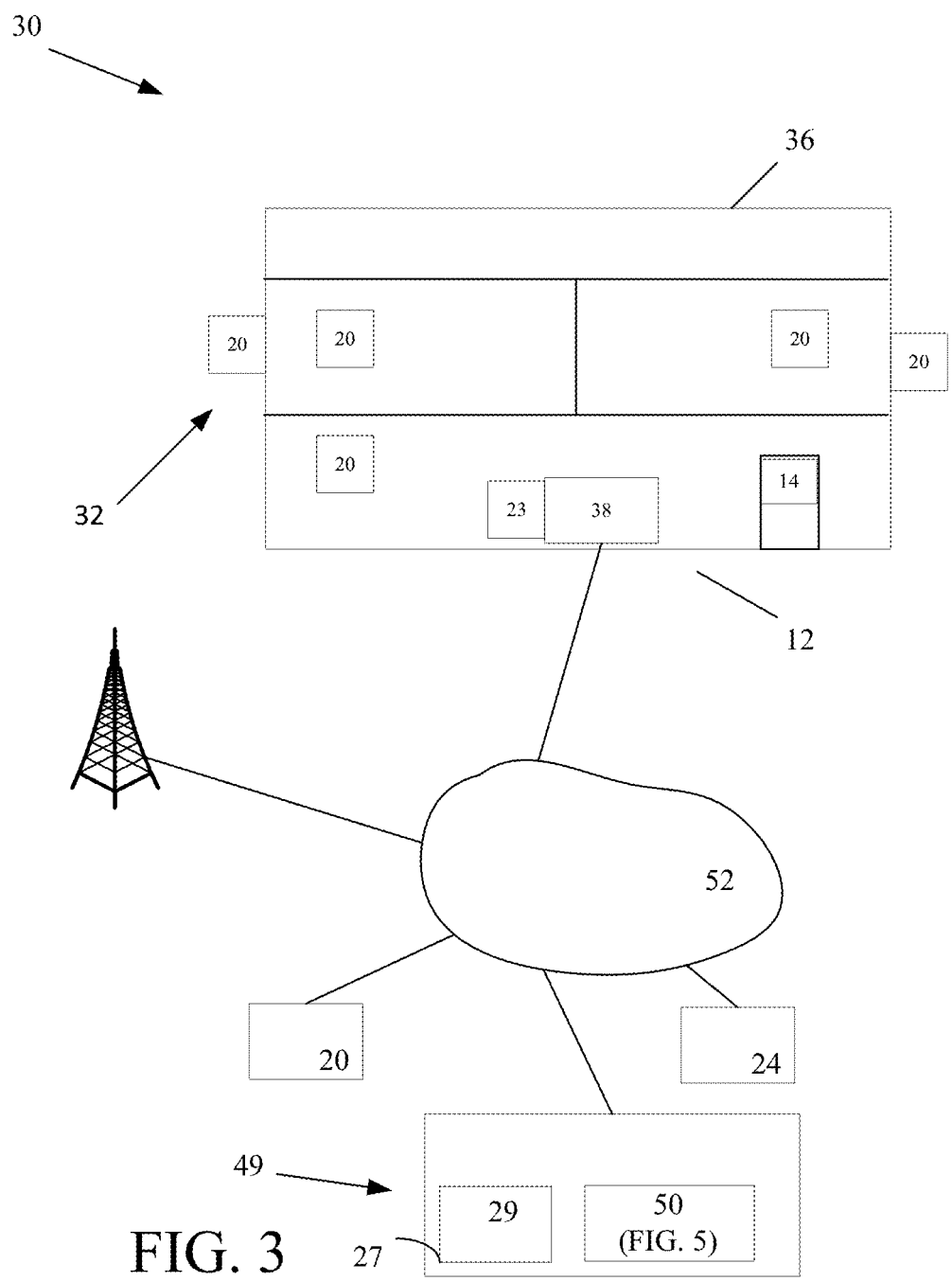
FIG. 3 is a schematic diagram of an example security system at premises.

Referring now to FIG. 3, an example application 30 of a security system in particular an intrusion detection system 32 and access control system 34 installed at a premises 36 is shown. In this example, the premises 36 is a commercial premises, but the premises may alternatively be any type of premises or building, e.g., industrial, etc. The intrusion detection system 32 includes an intrusion detection panel 38 and sensors/detectors 20 (FIGS. 1, 2) disbursed throughout the premises 36. The intrusion detection system 32 is in communication with a central monitoring station 49 (also referred to as central monitoring center) via one or more data or communication networks 52 (only one shown), such as the Internet; the phone system or cellular communication system being examples of others. The intrusion detection panel 38 receives signals from plural detectors/sensors 20 that send to the intrusion detection panel 38 information about the status of the monitored premises.

Sensor/detectors may be hard wired or communicate with the intrusion detection panel 38 wirelessly. Some or all of sensor/detectors 20 communicate wireless with the intrusion detection panel 18 and with the gateways. In general, detectors sense glass breakage, motion, gas leaks, fire, and/or breach of an entry point, and send the sensed information to the intrusion detection panel 38. Based on the information received from the detectors 20, the intrusion detection panel 38 determines whether to trigger alarms, e.g., by triggering one or more sirens (not shown) at the premises 36 and/or sending alarm messages to the monitoring station 20. A user may access the intrusion detection panel 38 to control the intrusion detection system, e.g., disarm, arm, enter predetermined settings, etc.

Also shown in FIG. 3 is a dispatch center 29 that in this example is part of the central monitoring station 49. The dispatch center 29 includes personnel stations (not shown), server(s) systems 14 running a program that populates a database (not shown) with historical data. The central monitoring station 49 also includes the sensor based state prediction system 50. An exemplary intrusion detection panel 38 includes a processor and memory, storage, a key pad and a network interface card (NIC) coupled via a bus (all not shown).

Figure 4:
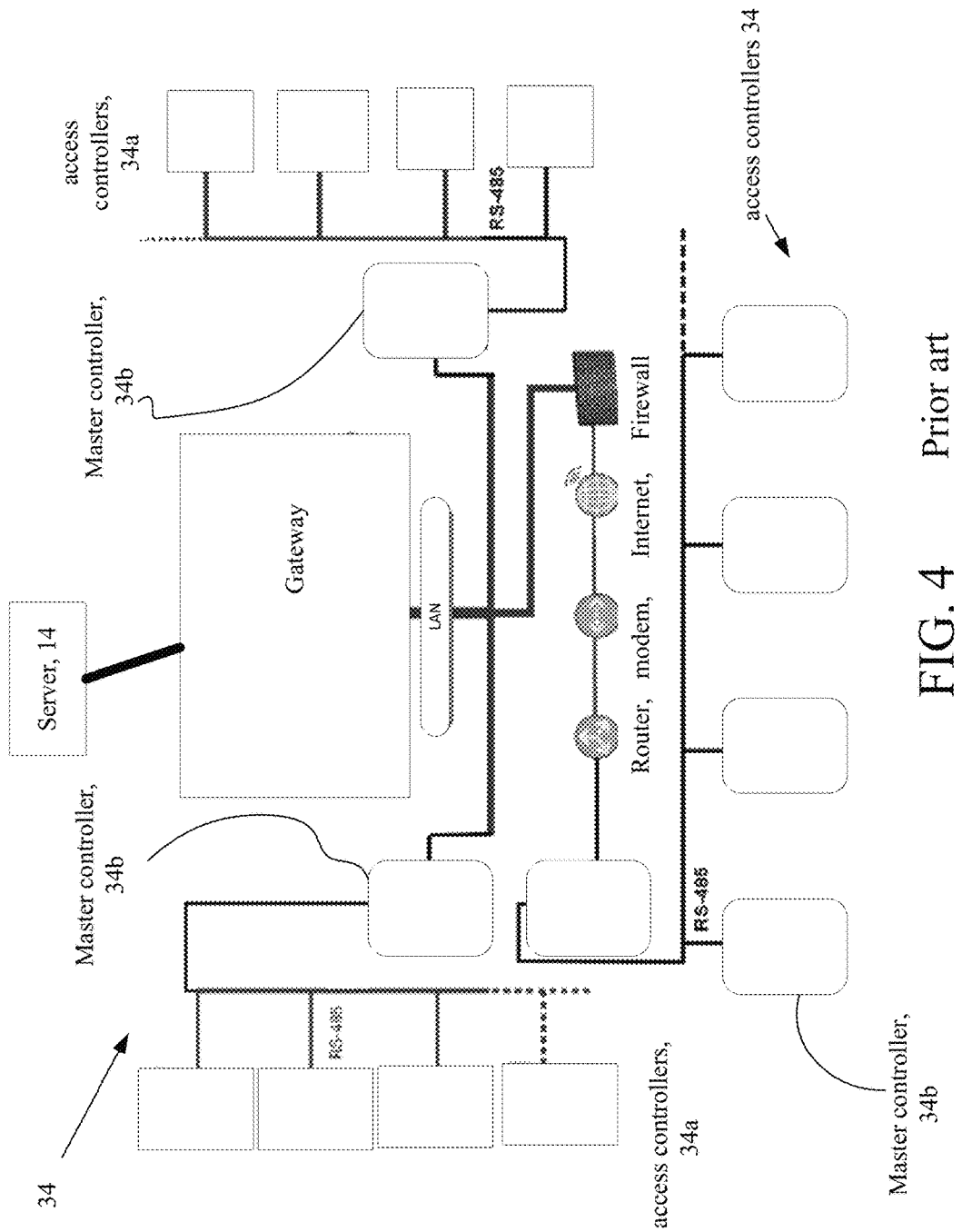
FIG. 4 is a block diagram showing an example of an access control system.

Referring now to FIG. 4, an exemplary access control system 34 is shown. Access control systems can be installed in residences but are more commonly installed in businesses. For example, as shown in FIG. 4A, a room (partially shown) has a doorway and has associated therein an access controller 16 and one or two card readers 14, (e.g. an ingress card reader and an egress card reader) with door locks (not shown) controlled by the access controller. The access control system 14 can include a plurality of access controllers and associated card readers, as shown in FIG. 4.

During installation of the access control system 34, the access controllers 34a are configured by a technician according to operational requirements of the facility. The access control system 34 also can include master access controllers 34b and includes a gateway that is coupled to the access controllers 34a via one or more master controllers 34b, as shown. The access control system 34 also includes infrastructure such as a LAN, router, modem, the Internet and cellular or serial communications and a firewall, as illustrated, and a server 14 (FIG. 1) that is coupled to the gateway 35a. This infrastructure can be part of the wireless sensor network structure discussed in FIG. 1.

Figure 5:
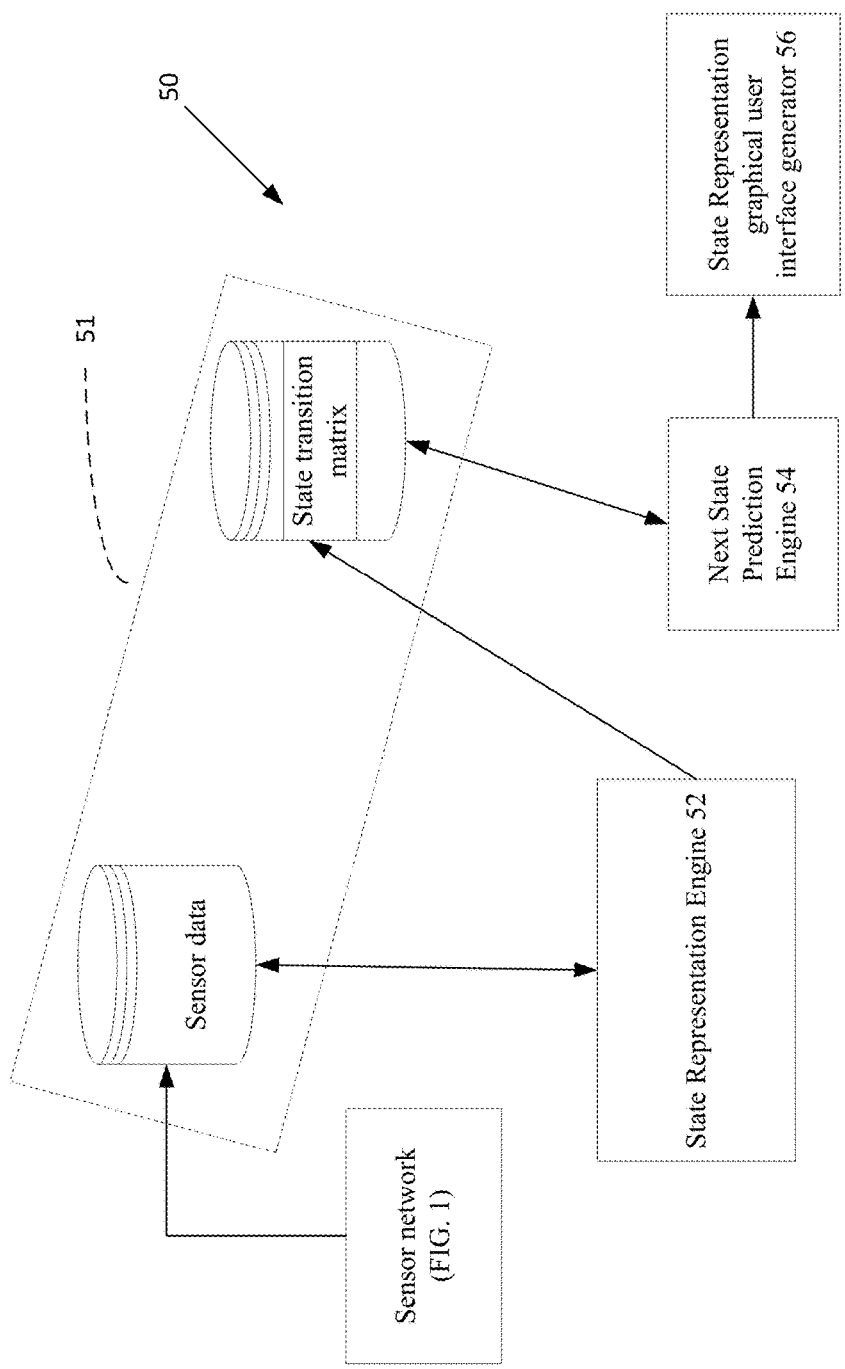
FIG. 5 is a block diagram of a sensor based state prediction system.

Referring now to FIG. 5, a sensor based state prediction system 50 is shown. The prediction system 50 executes on one or more of the cloud-based server computers and accesses database(s) 51 that sensor data and store state data in a state transition matrix. In some implementations, dedicated server computers could be used as an alternative.

The sensor based state prediction system 50 includes a State Representation Engine 52. The State Representation Engine 52 executes on one or more of the servers described above and interfaces on the servers receive sensor signals from a large plurality of sensors deployed in various premises throughout an area. These sensor signals have sensor values and together with other monitoring data represent a data instance for a particular area of a particular premises in a single point in time. The data represent granular information collected continuously from the particular premises. The State Representation Engine takes these granular values and converts the values into a semantic representation. For example, a set of sensor values and monitoring data for particular time duration are assigned a label, e.g., "State-1." As the data is collected continuously, this Engine 52 works in an unsupervised manner, as discussed below, to determine various states that may exist in the premises.

As the different states are captured, this Engine 52 also determines state transition metrics that are stored in the form a state transition matrix. A simple state transition matrix has all the states in its rows and columns, with cell entries being many times did the premises move from a state in cell i to a state in cell j are over a period of time and/or events. This matrix captures the operating behavior of the system. State transitions can happen either over time or due to events. Hence, the state transition metrics are captured using both time and events. A state is a representation of a group of sensors grouped according to a clustering algorithm.

The State transition matrix is a data structure that stores how many times the environment changed from State_i to State_j. The State transition matrix thus stores "knowledge" that the sensor based state prediction system 50 captures and which is used to determine predictions of the behavior of the premises. The State transition matrix is accessed by the Next prediction engine to make decisions and trigger actions by the sensor based state prediction system 50.

Unsupervised learning e.g., clustering is used to group sensor readings into states and conditions over a period of time that form a time trigger state and over events to form an event trigger state. Used to populate the state transition matrix per premises.

An exemplary simplified depiction for explanatory purposes of a State transition matrix is set out below:

| Instance | State transition | State transition | State transition | State transition | State transition | State transition |
|---|---|---|---|---|---|---|
|  | x, y | x, y | x, y | x, y | x, y | x, y |
|  | x, y | x, y | x, y | x, y | x, y | x, y |
|  | x, y | x, y | x, y | x, y | x, y | x, y |

Where columns in the State transition matrix is are "state transitions" expressed as a listing by instance with pointer to the state time and event trigger tables.

Entries x,y in cells of the State transition matrix are pointers that corresponds to the trigger tables that store the number of time periods and events respectively for each particular cell of the State transition matrix.

The State time trigger is depicted below. The State time trigger tracks the time periods t1 . . . t8 for each state transition corresponding to the number x in each particular cell.

| Instance | t1 | t2 | t3 | *** |
|---|---|---|---|---|
|  | State transition 1 | State transition 2 | State transition 3 | *** |
|  | 1 | 1 | 1 | *** |
|  | 1 | 1 | 1 | *** |
|  | t1 t5 | t2 t3 | t4 t7 t8 | *** |

State event trigger tracks the events E1 . . . E2 for each state transition corresponding to the number y in each particular cell (if any).

| Instance | e1 | e2 | e3 | *** |
|---|---|---|---|---|
|  | State transition 1 | State transition 2 | State transition 3 | *** |
|  |  |  | E2 | *** |
|  |  |  | E2 | *** |
|  | E1 | E1 | E3 | *** |

The State Representation Engine 52 in addition to populating the State transition matrix, also populates a State time trigger that is a data structure to store, the time value spent in each state and a distribution of the time duration for each state. Similar to the State transition matrix, the State time trigger also encapsulates the behavior knowledge of the environment. State transitions can be triggered using these values.

The State Representation Engine 52 also populates a State event trigger. The State event trigger is a data structure to store, event information. An example of an event can be sensor on a door sensing that a door was opened. There are many other types of events. This data structure captures how many times such captured events caused a state transition.

The State Representation Engine 52 populates the State Transition matrix and the State Time and State triggers, which together capture metrics, which provide a Knowledge Layer of the operational characteristics of the premises.

The sensor based state prediction system 50 also includes a Next State Prediction Engine 54. The Next State Prediction Engine 54 predicts an immediate Next state of the premises based the state transition matrix. The Next State Prediction Engine 54 predicts if the premises will be in either a safe state or a drift state over a time period in the future. The term "future" as used herein refers to a defined window of time in the future, which is defined so that a response team has sufficient time to address a condition that is predicted by the Next State Prediction Engine 54 that may occur in the premises to restore the state of the premises to a normal state. The Next State Prediction Engine operates as a Decision Layer in the sensor.

The sensor based state prediction system 50 also includes a State Representation graphical user interface generator 56. State Representation graphical user interface generator 56 provides a graphical user interface that is used by the response team to continuously monitor the state of the premises. The State Representation graphical user interface generator 56 receives data from the Next State Prediction Engine 54 to graphically display whether the premises is either in the safe state or the drifting state. The State Representation graphical user interface generator 56 operates as an Action Layer, where an action is performed based on input from Knowledge and Decision Layers.

The sensor based state prediction system 50 applies unsupervised algorithm learning models to analyze historical and current sensor data records from one or more customer premises and generates a model that can predict Next patterns, anomalies, conditions and events over a time frame that can be expected for a customer site. The sensor based state prediction system 50 produces a list of one or more predictions that may result in on or more alerts being sent to one more user devices as well as other computing system, as will be described. The prediction system 50 uses various types of unsupervised machine learning models including Linear/Non-Linear Models, Ensemble methods etc.

Figure 5A:
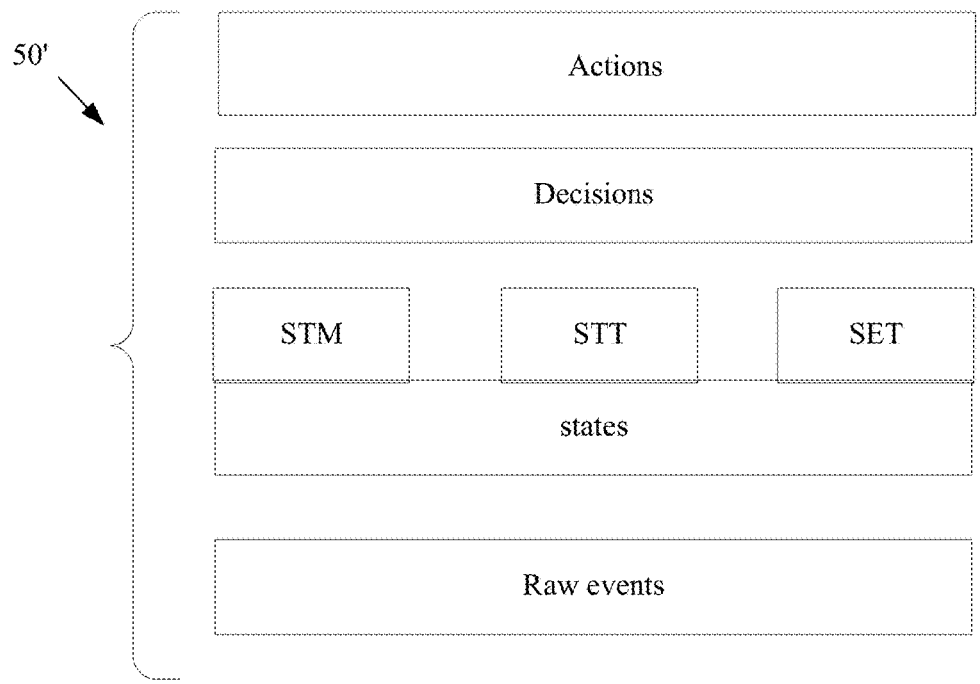
FIG. 5A is a diagram of a logical view of the sensor based state prediction system of FIG. 5.

Referring now to FIG. 5A, a logical view 50' of the sensor based state prediction system 50 is shown. In this view at the bottom is the raw events layer that is the sensors values and monitoring data from the environment under surveillance. The middle layer is an abstraction layer that abstracts these raw events as state (represented in FIG. 5A by the blocks "States" (State Representation Engine 52), STM (State Transition Matrix), STT (State Time Trigger) and SET (State Event Trigger) that produce a state as a concise semantic representation of the underlying behavior information of the environment described by time and various sensor values at that point in time. With the upper blocks being a Decisions block (Next State Prediction Engine 54) and Actions block (State Representation graphical user interface generator 56.)

Figure 6:
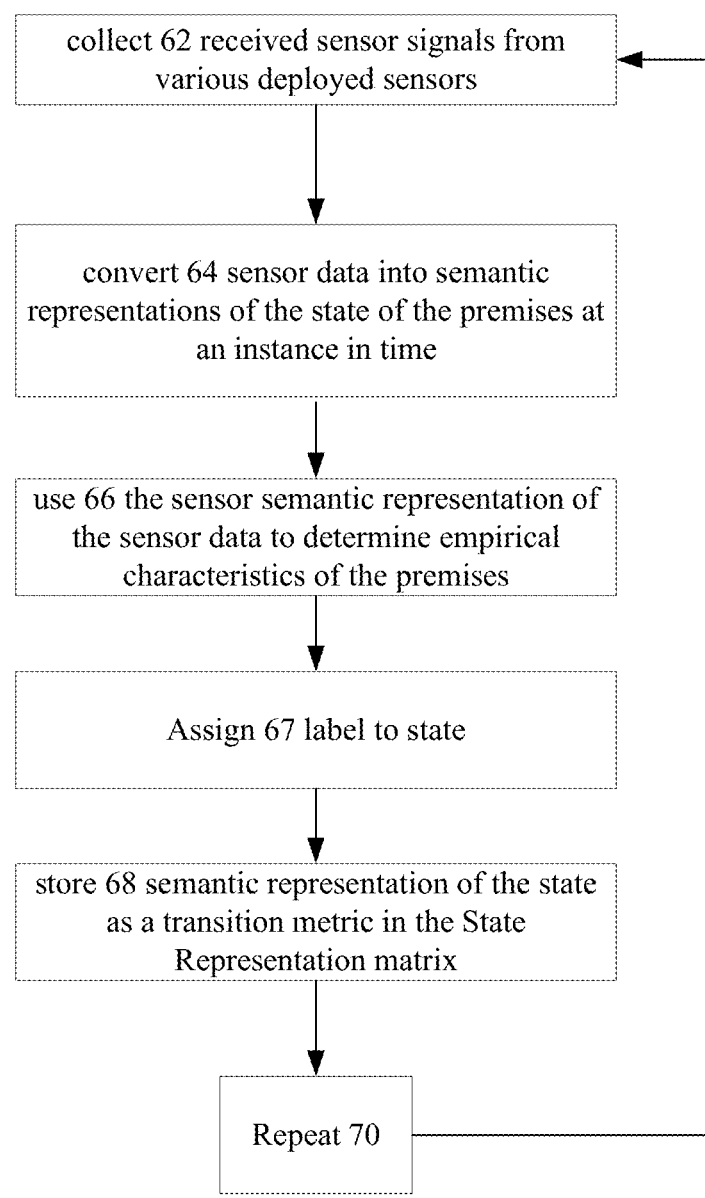
FIG. 6 is a flow diagram of a state representation engine.

Referring now to FIG. 6, the processing 60 for the State Representation Engine 52 is shown. The State Representation Engine 55 collects 62 (e.g., from the databases 51 or directly from interfaces on the servers) received sensor signals from a large plurality of sensors deployed in various premises throughout an area that is being monitored by the sensor based state prediction system 50. The sensor data collected from the premises, includes collected sensor values and monitoring data values.

An example of the sensor values is shown below (using fictitious data):

Site no.: 448192
Kitchen thermostat: 69,
Stove thermostat: 72,
Outdoor security panel: Active,
Kitchen Lights: On,
Delivery Door: Shutdown As these sensor signals have sensor values that represent a data instance for a particular area of a particular premises in a single point in time, the State Representation Engine 52 converts 64 this sensor data into semantic representations of the state of the premises at instances in time. The State Representation Engine 52 uses 66 the converted sensor semantic representation of the sensor data collected from the premises to determine the empirical characteristics of the premises. The State Representation Engine 52 assigns 67 an identifier to the state.

For example, the kitchen in a restaurant example for a premises identified in the system as "Site no.: 48192" uses the sensor values to produce a first state that is identified here as "State 1." Any labelling can be used and is typically consecutive identified and this state is semantically described as follows:

State 1: Kitchen thermostat: 69, Stove thermostat:72, Outdoor security panel: Active, Kitchen Lights: On, Delivery Door: Shutdown, current time: Monday 5:00 AM PST, start time: Sunday 10:00 PM PST The semantic description includes the identifier "State 1" as well as semantic descriptions of the various sensors, their values and dates and times.

The State Representation Engine 52 determines an abstraction of a collection of "events" i.e., the sensor signals as state. The state thus is a concise representation of the underlying behavior information of the premises being monitored, described by time and data and various sensor values at that point in time and at that date.

The semantic representation of the state is stored 68 by the State Representation Engine 52 as state transition metrics in the State Representation matrix. Over time and days, as the sensors produce different sensor values, the State Representation Engine 55 determines different states and converts these states into semantic representations that are stored the state transition metrics in the matrix, e.g., as in a continuous loop 70.

The kitchen example is further set out below:

The State Representation Engine 52 collects the following data (fictitious data) from these three sensors at a particular points in time,

| Obstruction Detector | Room Thermostat | Stove Thermostat |
|---|---|---|
| 0 | 71.1755732 | 78.95655605 |
| 0 | 68.27180645 | 79.97821825 |
| 0 | 71.80483918 | 79.428149 |
| 0 | 70.46354628 | 81.90901291 |
| 0 | 69.83508114 | 81.12026772 |
| 0 | 71.46074066 | 81.613552 |
| 1 | 70.14174204 | 80.12242015 |
| 1 | 70.98180652 | 78.03049081 |

The state representation engine 52, converts these raw values into state definitions and assigns (labels) each with a unique identifier for each state, as discussed above. As the premises is operated over a period of time, the Next transition matrix, the state time trigger matrix and the state event trigger matrix are filled.

Continuing with the concrete example, the state representation engine 52 produces the following two states (State 1is repeated here for clarity in explanation).

State1: Kitchen thermostat:69, Stove thermostat: 72, Outdoor security panel: Active, Kitchen Lights: On, Delivery Door: Shutdown, current time: Sunday 10:00 PM.

State 2: Kitchen thermostat: 69, Stove thermostat: 80, Outdoor security panel: Active, Kitchen Lights: On, Delivery Door: Shutdown, current time: Sunday 10:15 PM State 3: Kitchen thermostat: 69, Stove thermostat: 60, Outdoor security panel: Active, Kitchen Lights: On, Delivery Door: Shutdown, current time: Monday 1:00 AM.

Between State 1 and State 2 there is a transition in which over a 15 minute span the Stove thermostat value increased from 72 to 80 and from State 2 to State 3 the Stove thermostat value decreased from 80 to 72 over a 2 hr. and 45 min. period, which can likely be attributed to something being cooked between State 1 and State 2 and by State 3 the order was filled, item removed from stove and the stove thermostat shows a lower value.

The state representation engine 52, adds to the state transition matrix an entry that corresponds to this transition, that the premises moved from state 1 to state 2. The state representation engine 52, also adds to the state transition matrix in that entry, an indicator that the transition was "time trigger," causing the movement, and thus the state representation engine 52 adds an entry in state time trigger matrix. The state representation engine 52, thus co-ordinates various activities inside the premises under monitoring and captures/determines various operating characteristics of the premises.

Figure 7:
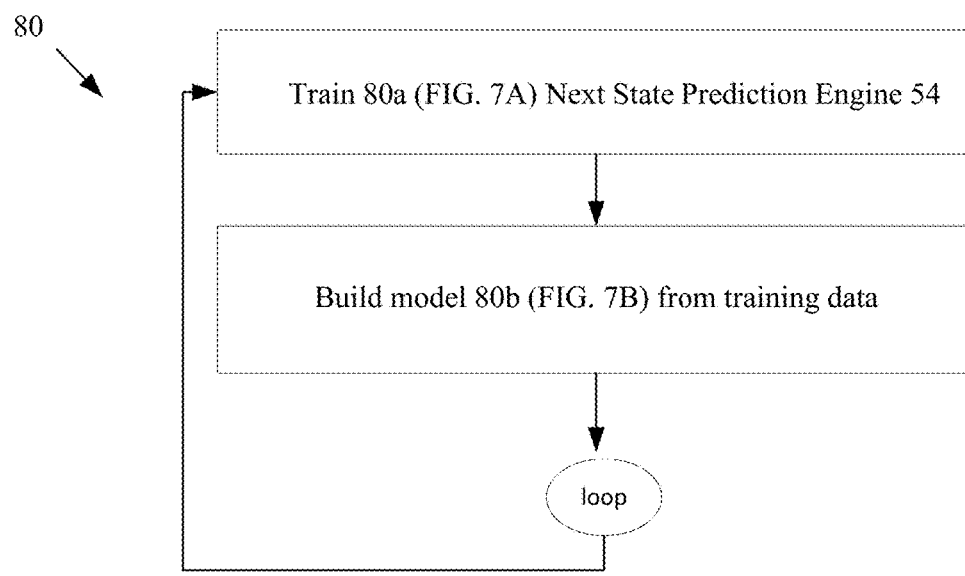
FIG. 7 is a flow diagram of sensor based state prediction system processing.

Referring now to FIG. 7 processing 80 for the Next State Prediction Engine 54 is shown. This processing 80 includes training processing 80a (FIG. 7A) and model building processing 80b (FIG. 7B), which are used in operation of the sensor based state prediction system 50.

Figure 7A:
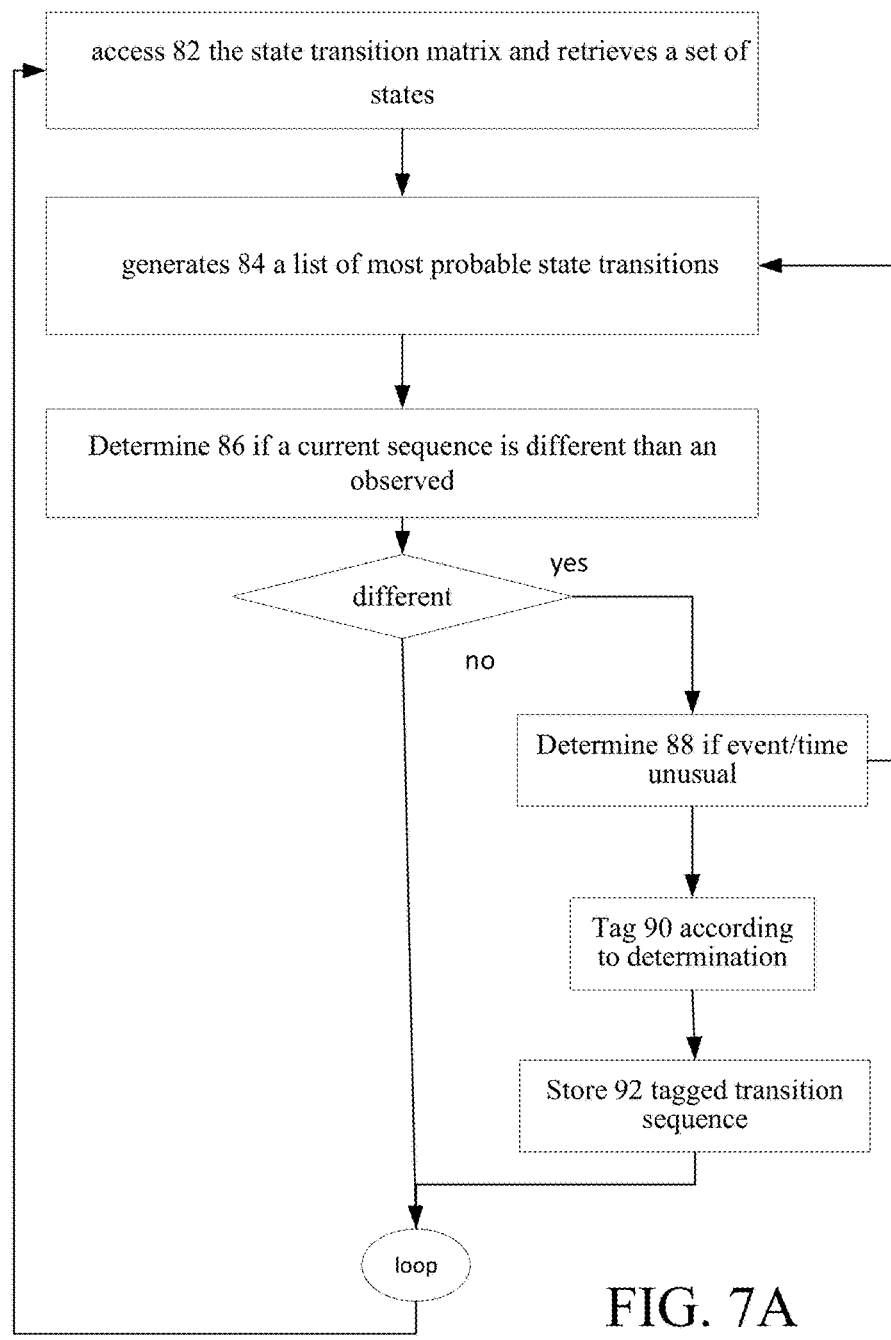
FIG. 7A is a flow diagram of training process for a Next state predictor engine that is part of the sensor based state prediction system.

Referring now to FIG. 7A, the training processing 80a that is part of the processing 80 for the Next State Prediction Engine 54 is shown. In FIG. 7A, training processing 80' trains the Next State Prediction Engine 54. The Next State Prediction Engine 54 accesses 82 the state transition matrix and retrieves a set of states from the state transition matrix. From the retrieved set of states the Next State Prediction Engine 54 generates 84 a list of most probable state transitions for a given time period, the time period can be measured in minutes, hours, days, weeks, months, etc. For example, consider the time period as a day. After a certain time period of active usage, the sensor based state prediction system 50, through the state representation engine 52, has acquired knowledge states s1 to s5.

From the state transition matrix the system uses the so called "Markov property" to generate state transitions. As known, the phrase "Markov property" is used in probability and statistics and refers to the "memoryless" property of a stochastic process.

From the state transition matrix using the so called "Markov property" the system generates state transition sequences, as the most probable state sequences for a given day.

An exemplary sequence uses the above fictitious examples is shown below:
s1 s2 s4 s5
s2 s2 s4 s5

The Next State Prediction Engine 54 determines 86 if a current sequence is different than an observed sequence in the list above. When there is a difference, the Next State Prediction Engine 54 determines 88 whether something unusual has happened in the premises being monitored or whether the state sequence is a normal condition of the premises being monitored.

With this information the Next State Prediction Engine 54 90 these state transitions as "safe" or "drift state" transitions. Either the Next State Prediction Engine 54 or manual intervention is used to label either at the state transition level or the underlying sensor value levels (fictitious) for those state transitions producing the follow:

| Obstruction Detector | Room Thermostat | Stove Thermostat | Safety State (label) |
|---|---|---|---|
| 0 | 71.1755732 | 78.95655605 | G |
| 0 | 68.27180645 | 79.97821825 | G |
| 0 | 71.80483918 | 79.428149 | G |
| 0 | 70.46354628 | 81.90901291 | G |

| Obstruction Detector | Room Thermostat | Stove Thermostat | Safety State (label) |
|---|---|---|---|
| 0 | 69.83508114 | 81.12026772 | G |
| 0 | 71.46074066 | 81.613552 | G |
| 1 | 70.14174204 | 80.12242015 | G |
| 1 | 70.98180652 | 78.03049081 | G |
| 0 | 68.58285177 | 79.981358 | G |
| 0 | 69.91571802 | 79.4885171 | G |
| 1 | 69.89799953 | 79.3838372 | G |
| 0 | 70.42668373 | 80.20397118 | G |
| 1 | 70.23391637 | 81.80212485 | Y |
| 0 | 68.19244768 | 81.19203004 | G |

The last column in the above table is the label, wherein in this example "G" is used to indicate green, e.g., a normal operating state, e.g., "a safe state" and "Y" is used to indicate yellow, e.g., an abnormal or drift state, e.g., an "unsafe state" and "R" (not shown above) would be used to represent red or a known unsafe state. This data and states can be stored in the database 51 and serves as training data for a machine learning model that is part of the Next State Recommendation Engine 54.

Figure 7B:
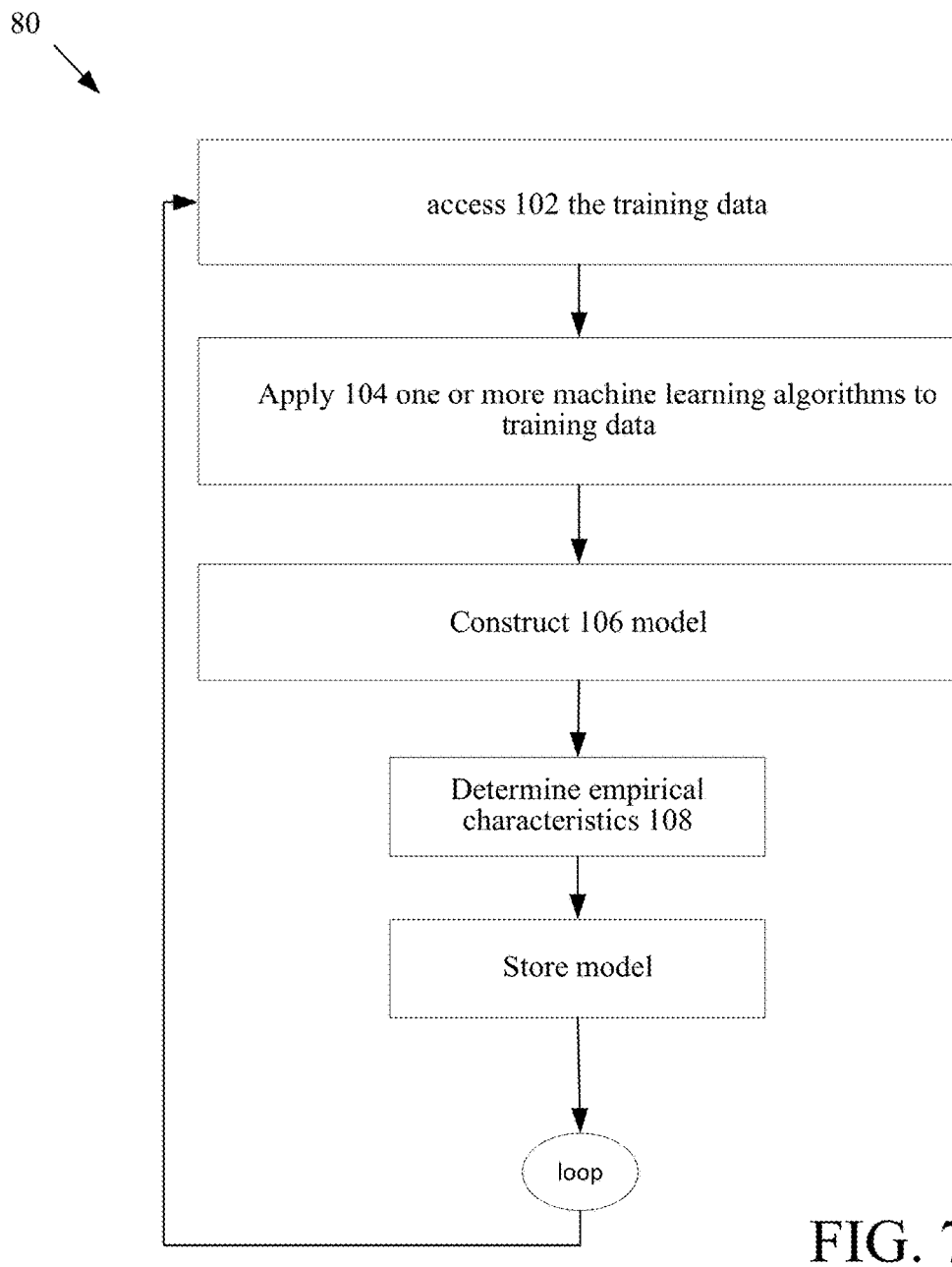
FIG. 7B is a flow diagram of a Next state predictor engine model building process.

Referring now to FIG. 7B, the model building processing 80b of the Next State Recommendation Engine 54 is shown. The model building processing 80b uses the above training data to build a model that classify a system's state into either a safe state or an unsafe state. Other states can be classified. For example, three states can be defined, as above, "G Y R states" or green (safe state) yellow (drifting state) and red (unsafe state). For ease of explanation two states "safe" (also referred to as normal) and "unsafe" (also referred to as drift) are used. The model building processing 80b accesses 102 the training data and applies 104 one or more machine learning algorithms to the training data to produce the model that will execute in the Next State Recommendation Engine 54 during monitoring of systems. Machine learning algorithms such as Linear models and Non-Linear Models, Decision tree learning, etc., which are supplemented with Ensemble methods (where two or more models votes are tabulated to form a prediction) and so forth can be used. From this training data and the algorithms, the model is constructed 106.

Below is table representation of a fictitious Decision Tree using the above fictitious data (again where "G" is used to indicate green, "a safe state" e.g., a normal operating state, and "Y" is used to indicate yellow, e.g., drifting state, and "R" (shown below) to represent red or a known unsafe state. This data and states can be stored in the database 51 and serves as training data for a machine learning model that is part of the Next State Recommendation Engine 54.

```
stoveThermoStat == '(-inf-81.064396]'
| obstructionDetector = 0: G
| obstructionDetector = 1: G
stoveThermoStat == '(81.064396-84.098301]'
| obstructionDetector = 0: G
| obstructionDetector = 1: Y
stove ThermoStat == '(84.098301-87.132207]': R
stoveThermoStat == '(87.132207-90.166112]'
| obstructionDetector = 0: R
| obstructionDetector = 1: R
stoveThermoStat = '(90.166112-inf)'
| obstructionDetector = 0: R
| obstructionDetector = 1: R
```

Empirical characteristics can be a model based and human based are determined 106 for various states of the premises in terms of, e.g., safety of the occupants and operational conditions of the various systems within the premises. Examples of such systems include intrusion detection systems, fire alarm systems, public annunciation systems, burglar alarm systems, the sensors deployed at the premises, as well as other types of equipment, such as refrigeration equipment, stoves, and ovens that may be employed in the kitchen example that will be discussed below. Other instances of particular premises will have other types of systems that are monitored. Based on the empirical determined states of the various systems within the premises being monitored, the sensor based state prediction system 50 will determine the overall state of the premises as well as individual states of the various systems within the premises being monitored, as will be discussed below.

Figure 8:
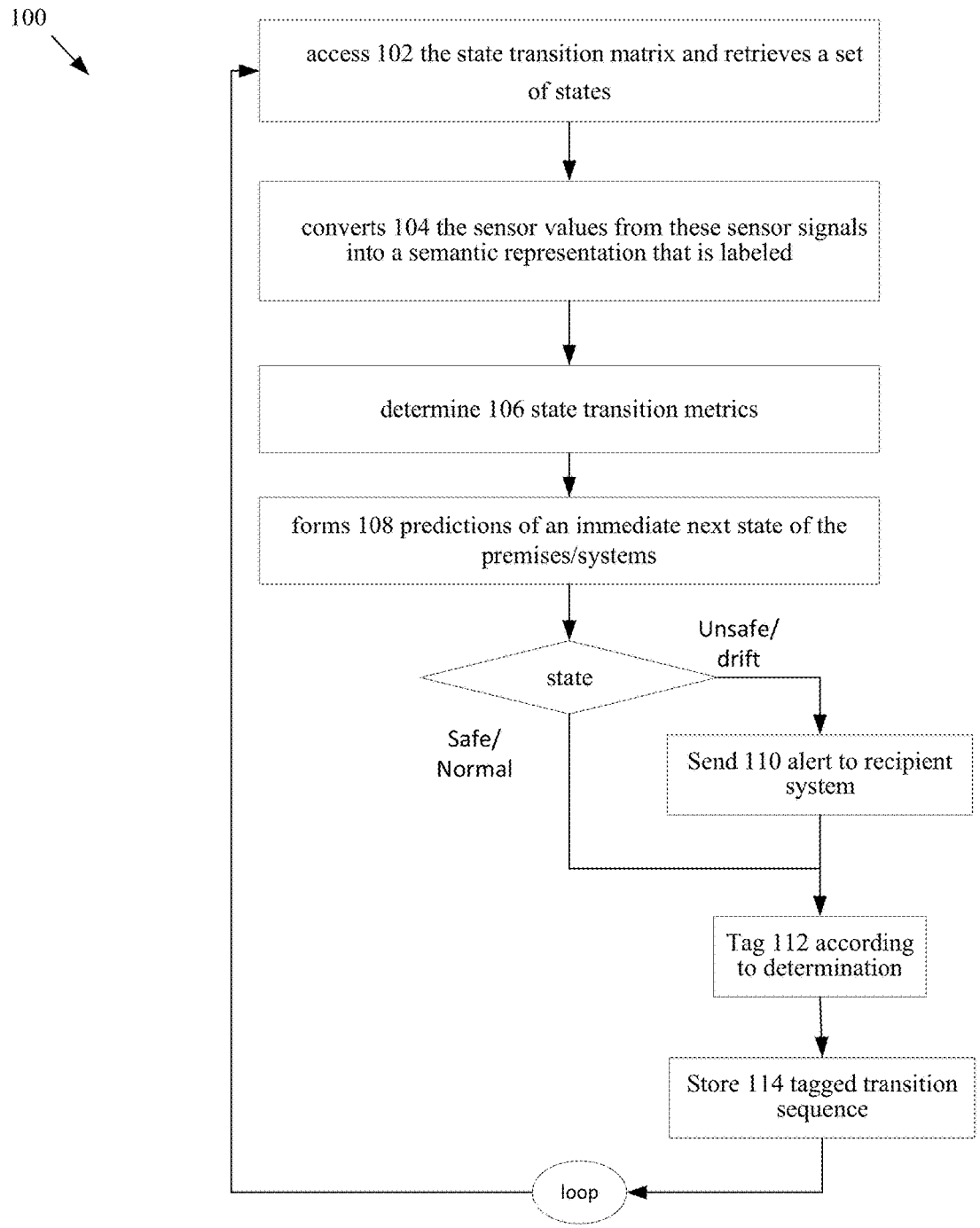
FIG. 8 is a flow diagram of operation processing by the sensor based state prediction system.

Referring now to FIG. 8, operational processing 100 of the sensor based state prediction system 50 is shown. The sensor based prediction system 50 receives 102 (by the State Representation Engine 52) sensor signals from a large plurality of sensors deployed in various premises throughout an area being monitored. The State Representation Engine 52 converts 104 the sensor values from these sensor signals into a semantic representation that is identified, as discussed above. As the data is collected continuously, this Engine 52 works in an unsupervised manner to determine various states that may exist in sensor data being received from the premises. As the different states are captured, the State Representation Engine 52 also determines 106 state transition metrics that are stored in the state transition matrix using both time and events populating the State time trigger and the State event trigger, as discussed above. The State transition matrix is accessed by the Next prediction engine 54 to make decisions and trigger actions by the sensor based state prediction system 50.

The Next State Prediction Engine 54 receives the various states (either from the database and/or from the State Representation Engine 52 and forms 108 predictions of an immediate Next state of the premises/systems based the state data stored in the state transition matrix. For such states the Next State Prediction Engine 54 predicts if the premises will be in either a safe state or a drift state over a time period in the Next as discussed above.

The sensor based state prediction system 50 also sends 110 the predictions to the State Representation engine 56 that generates a graphical user interface to provide a graphical user interface representation of predictions and states of various premises/systems. The state is tagged 112 and stored 114 in the state transition matrix.

The sensor based state prediction system 50 using the State Representation Engine 52 that operates in a continuous loop to generate new states and the Next State Prediction Engine 54 that produces predictions together continually monitor the premises/systems looking for transition instances that result in drift in states that indicate potential problem conditions. As the sensors in the premises being monitored operate over a period of time, the state transition matrix, the state time trigger matrix and the state event trigger matrix are filled by the state representation engine 52 and the Next State Prediction Engine 54 processing 80 improves on predictions.

The sensor based state prediction system 50 thus determines the overall state of the premises and the systems by classifying the premises and these systems into a normal or "safe" state and the drift or unsafe state. Over a period of time, the sensor based state prediction system 50 collects information about the premises and the sensor based state prediction system 50 uses this information to construct a mathematical model that includes a state representation, state transitions and state triggers. The state triggers can be time based triggers and event based triggers, as shown in the data structures above.

Figure 9:
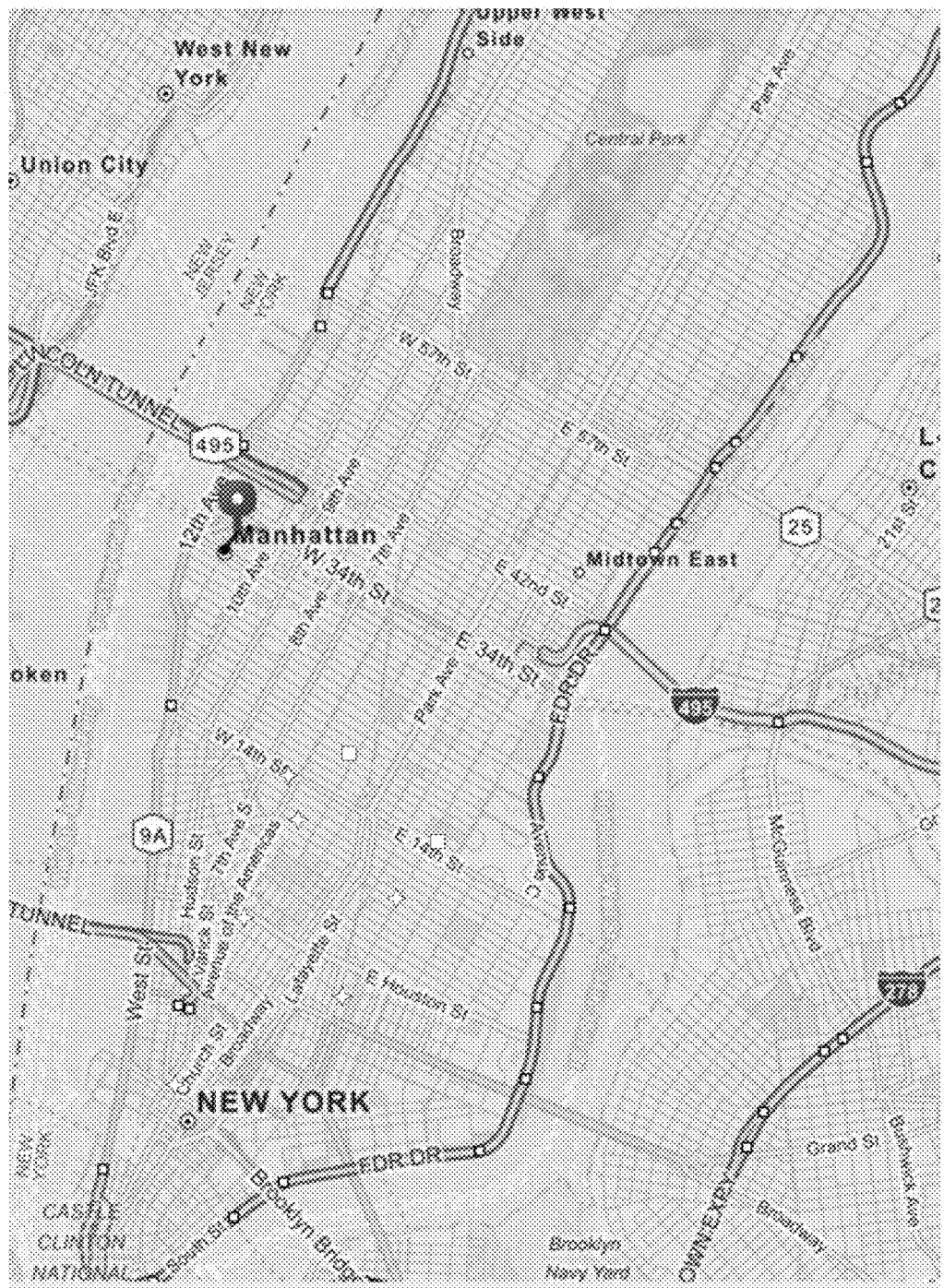
FIG. 9 is a diagram depicting an exemplary interface.

Referring now to FIG. 9, the State Representation graphical user interface generator 56 receives data from the Next State Prediction Engine 54 and generates a graphical user interface that is rendered on a display device of a client system. Several different graphical user interfaces can be generated. One such interface is depicted in FIG. 9 and shows premises conditions at a fictitious e.g., restaurant chain of fictitious restaurant locations (in Manhattan) with indicators (stars and squares) to indicated the predicted state of the premises as either in the safe state or the drifting state, respectively. Various shapes, colors and other effects can be used. The State Representation graphical user interface generator 56 operates as the Action Layer, where an action is performed based on input from Knowledge and Decision Layers.

Figure 10:
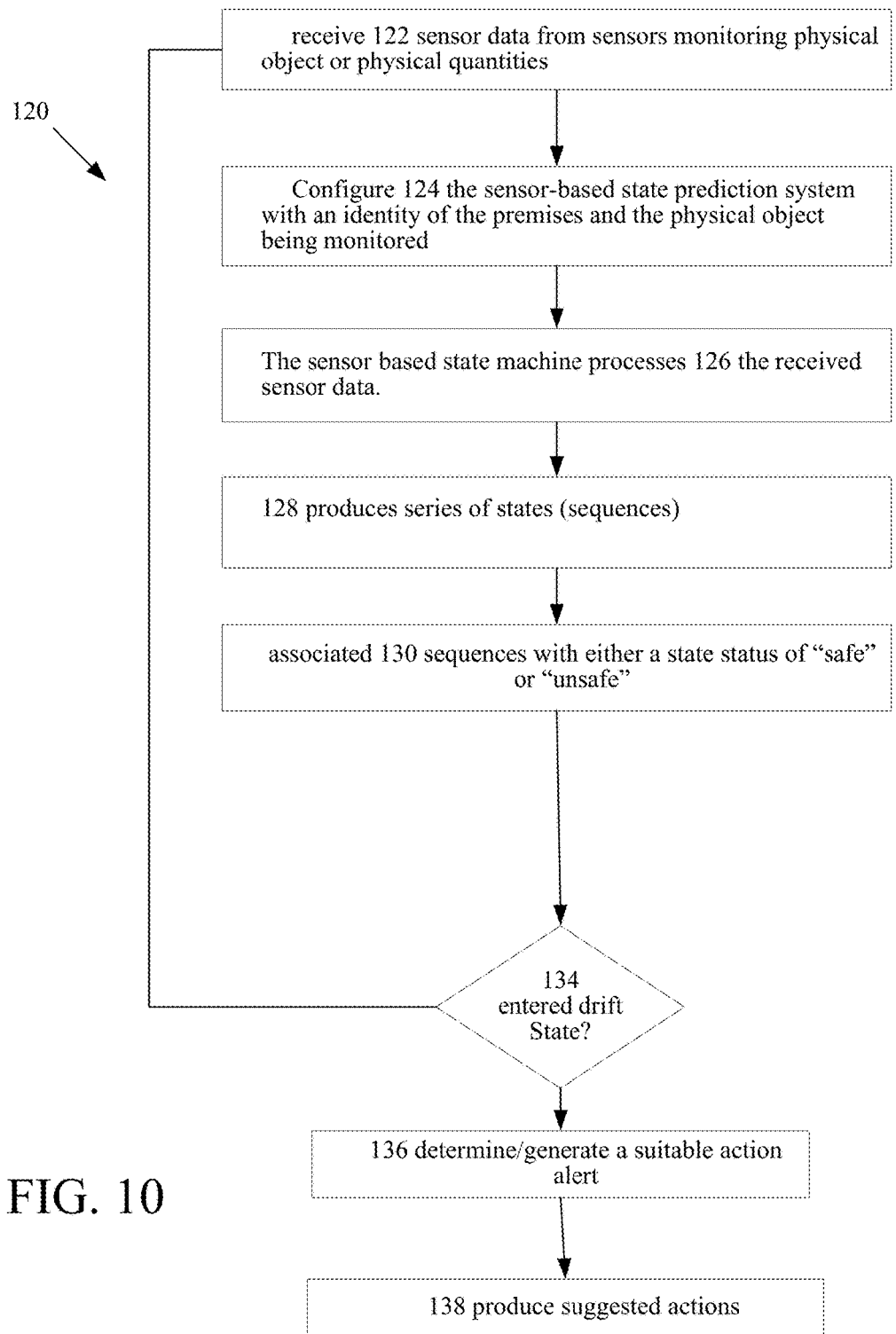
FIG. 10 is a flow diagram of an example of sensor based risk profiling.

Referring now to FIG. 10, processing 120 of sensor information using the architecture above is shown. The sensor-based state prediction system 50 receives 122 sensor data from sensors monitoring each physical object or physical quantity from the sensors (FIG. 2) deployed in a premises. The sensor-based state prediction system 50 is configured 124 with an identity of the premises and the physical objects being monitored by the sensors in the identified premises. The sensor based state machine 50 processes 126 the received sensor data to produce states as set out above using the unsupervised learning models. Using these models the sensor-based state prediction system 50 monitors various physical elements to detect drift states.

For example, one of the sensors can be a vibration sensor that sends the sensor-based state prediction system 50 a signal indicating a level of detected vibration from the vibration sensor. This signal indicates both magnitude and frequency of vibration. The sensor-based state prediction system 50 determines over time normal operational levels for that sensor based on what system that sensor is monitoring and together with other sensors produces 128 series of states for the object and/or premises. These states are associated 130 with either a state status of "safe" or "unsafe" (also referred to herein as "normal" or "drift," respectively). Part of this process of associating is provided by the learning process and this associating can be empirically determined based on human input. This processing thus develops more than a mere envelope or range of normal vibration amplitude and vibration frequency indications for normal operation for that particular vibration sensor, but rather produces a complex indication of a premises or object state status by combining these indications for that sensor with other indications from other sensors to produce the state transition sequences mentioned above.

States are produced from the unsupervised learning algorithms (discussed above in FIGS. 7-7B) based on that vibration sensor and states from other sensors, which are monitoring that object/premises. The unsupervised learning algorithms continually analyze that collected vibration data and producing state sequences and analyze state sequences that include that sensor. Overtime, as the analysis determines 134 that states including that sensor have entered into a drift state that corresponds to an unsafe condition, the sensor-based state prediction system 50 determines 136 a suitable action alert (in the Action layer) to indicate to a user that there may be something wrong with the physical object being monitored by that sensor. The analysis provided by the prediction system sends the alert to indicate that there is something going wrong with object being monitored. The sensor-based state prediction system 50 produces suggested actions 138 that the premises' owner should be taking with respect to the object being monitored.

Figure 11:
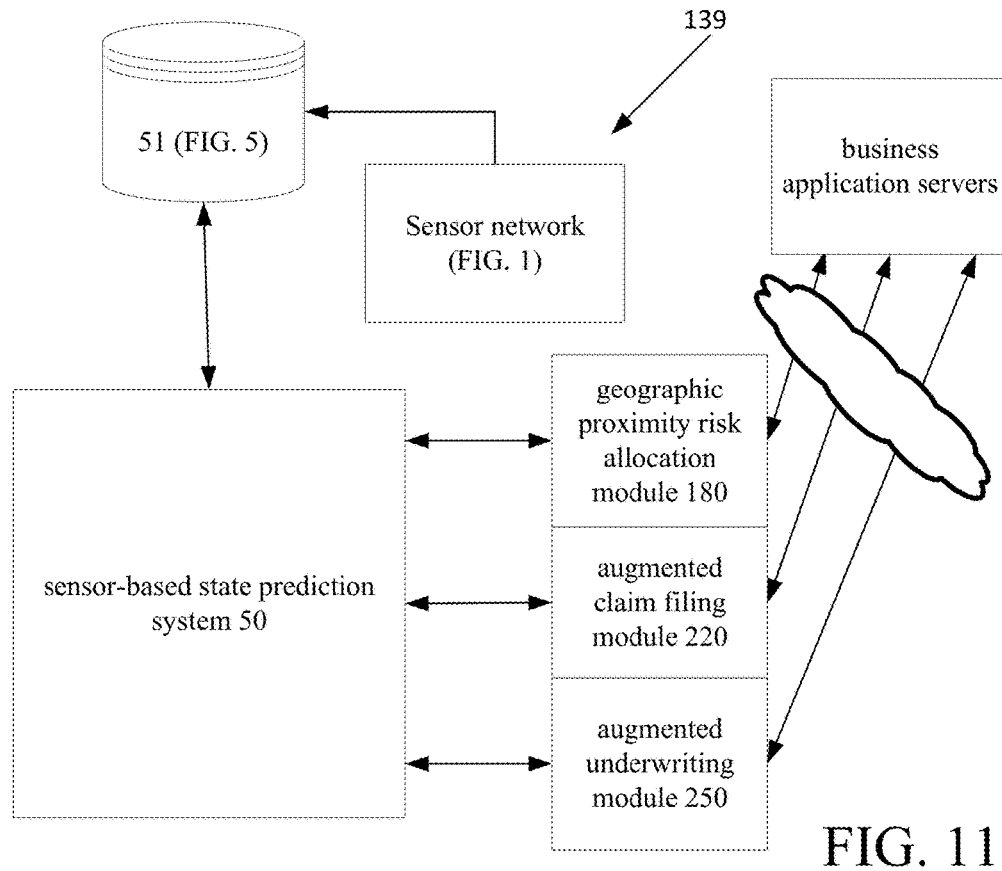
FIG. 11 is a block diagram of an system architecture.
Figure 11A:
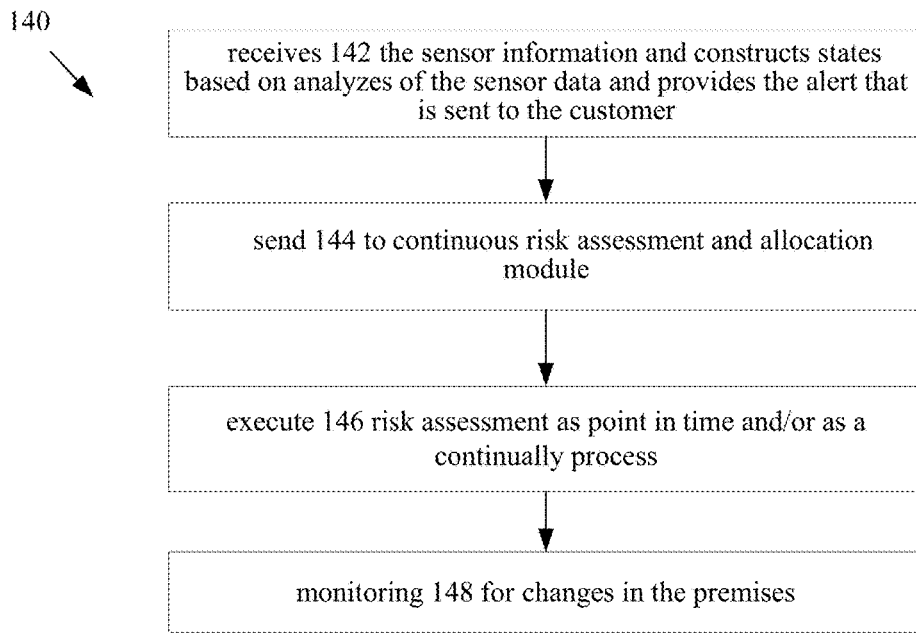
FIG. 11A is a flow diagram of an example of sensor based risk assessment.
Figure 13A:
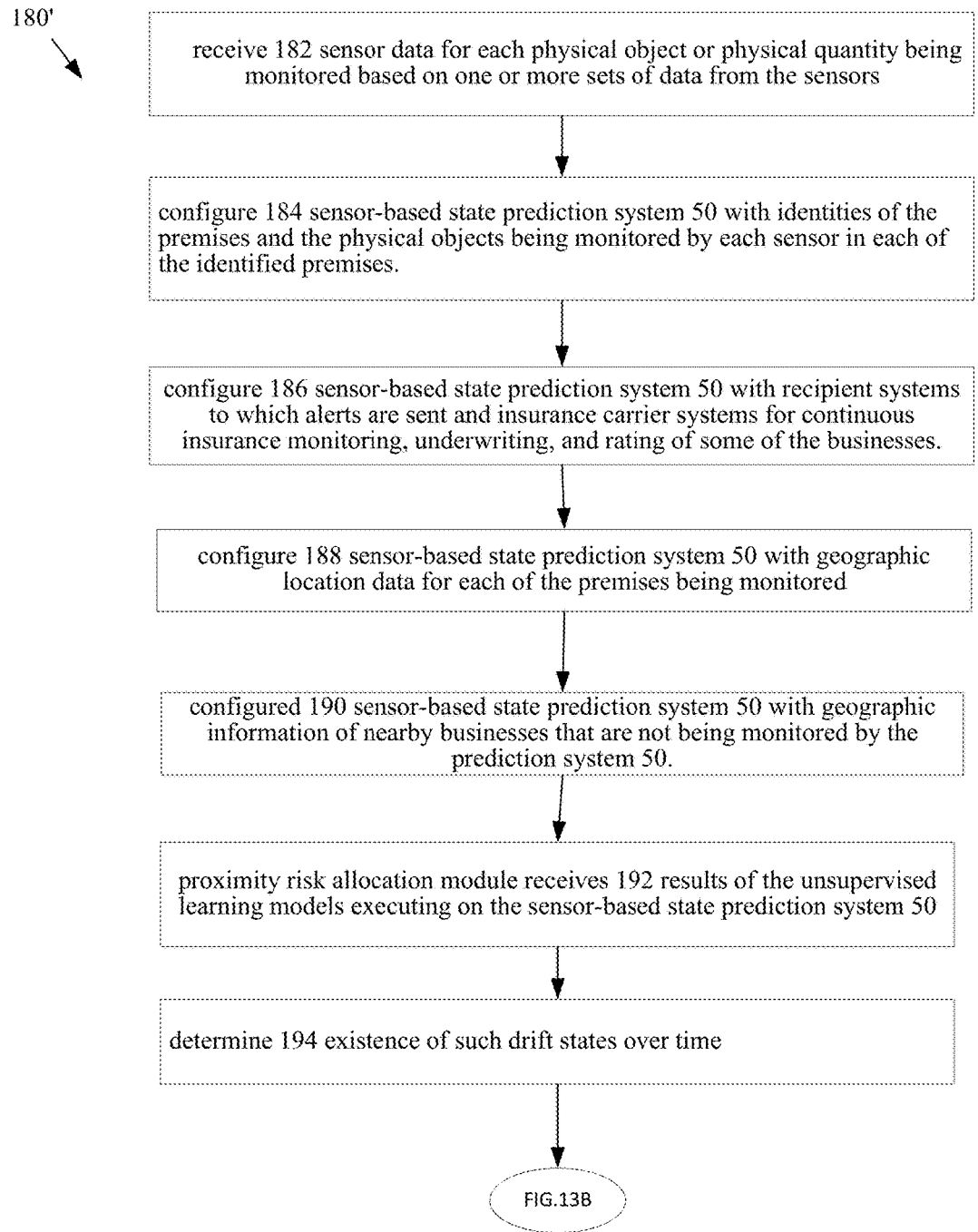

Referring now to FIG. 11, an architecture 139 that combines the sensor-based state prediction system 50 (FIG. 5) in a cooperative relationship with business application servers 139a in the cloud is shown. In FIG. 11, the sensor-based state prediction system 50 receives sensor data from the sensor network 11 (or storage 51) for a particular premises, processes that data to produce states and state sequences, and uses this information in conjunction with business application servers to process risk-based adjustments in insurance policy premiums, underwriting of insurance policies, and augmented claims submission for insured events under an insurance policy. The sensor-based state prediction system 50 includes a geographic proximity risk allocation module 180 (see processing 180' FIGS. 13A, 13B), an augmented claim filing module 220 (see processing 220' FIG. 14) and an augmented underwriting module 250 (see processing 250' FIG. 15).

Referring now to FIG. 11, processing 140 in the sensor-based state prediction system 50 includes providing a pre-set suite of sensor packs (discussed below) that are selected especially to collect data relevant to the type of business and relevant to the type of insurance being provided. (See discussion below regarding pre-set sensor packs). The sensor-based state prediction system 50 receives 140 the sensor information and constructs states based on analyzes of the sensor data and provides the alert that is sent to the customer. That alert and selected information either the state and/or sensor data are sent 144 to a "continuous risk assessment and allocation" module that assesses insurance risk on a dynamic basis, as discussed below.

The risk assessment can either be a risk assessment that is point in time based (e.g., the single episode discussed above) or the risk assessment can be continually based on the actions taken by the customer and the sensor data received. An example of risk assessment that is point in time based is for instance risk assessment that is based on changes in the types of material that are housed in a premises or changing of types of machinery being operated or disabled in the premises or the types of activities that the premises are being used for. All of these changes can be monitored 148 by the sensor-based state prediction system 50 from data received from one or more sensor packs.

The customized sensor packs that are deployed at customer premises gather sensor data that are relevant to the type of insurance provided to the premises and the type of premises being insured. The sensor-based state prediction system 50 in addition to providing monitoring of conditions at customer premises and generating alerts as needed, provides an architecture that can be used to change insurance rates on on-going basis.

Figure 12:
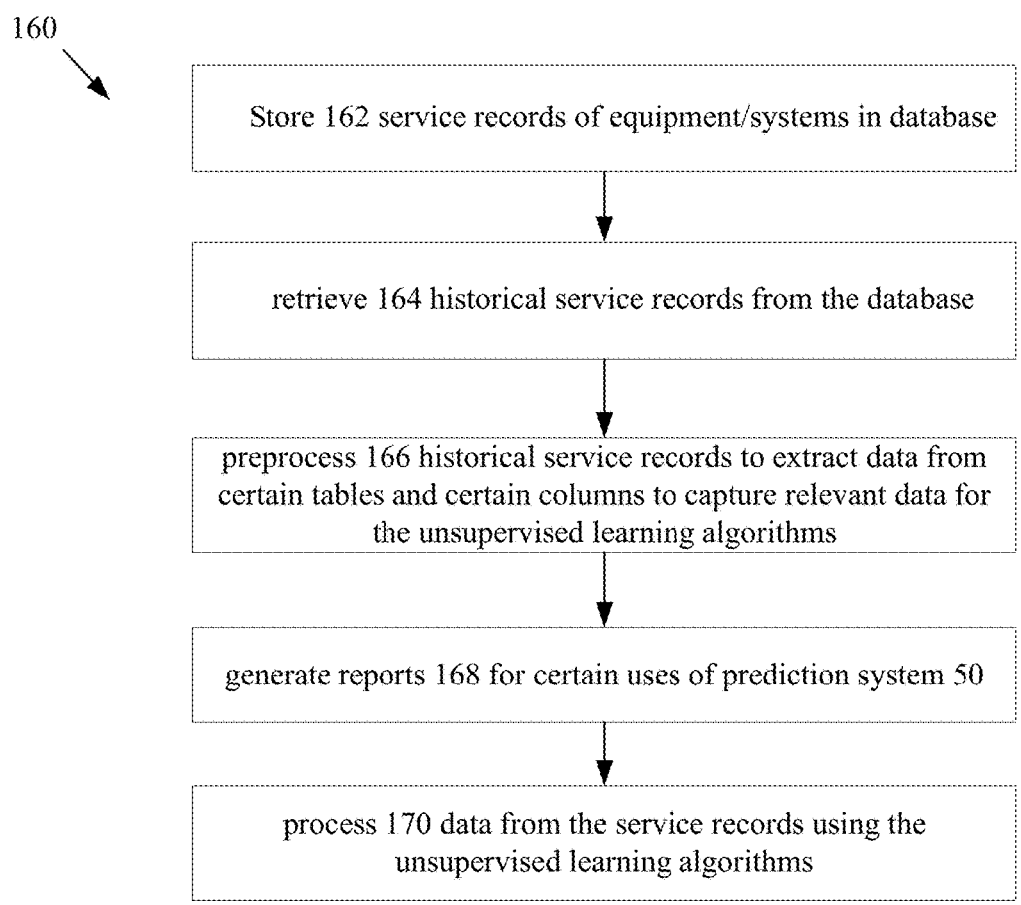
FIG. 12 is a flow diagram of an example of service record processing.

Referring now to FIG. 12, processing by the sensor-based state prediction system 50 can also include processing 160 of service records of equipment/systems. Technicians commonly service systems/equipment and as a result generate service records (historical records). These service records are stored 162 in e.g., the database 51 or some other database accessible by the sensor-based state prediction system 50. The sensor-based state prediction system 50 retrieves 164 historical service records from the database 51 according to the application. Typically, historical service records are available in multiple tables in a normalized form. Historical service records data are preprocessed 166 from certain tables and certain columns to capture particulars data relevant to the systems and needed by the unsupervised learning algorithms.

In one example the following data are captured from service records.

| Field Name | Field Description |
| --- | --- |
| Customer No: | Uniquely identifies a customer |
| Site No: | Uniquely identifies a customer site/store |
| Region No: | Sites are categorized into regions, this uniquely identifies a region |
| Job No: | Uniquely identifies a job |
| Date: | Date job created |
| Job Cause Number: | A number that identifies a particular reason why the job was requested. |
| Job Cause Desc: | A textual description of the job cause, for example, "Faulty part" |
| Resolution No: | The resolution that was used to fix the problem. |
| Resolution Desc: | A textual description of the fix. |
| Job Comments: | A free text field, where the job done is described by the technician. |

With an understanding of the above data, the sensor-based state prediction system 50 generates reports 168 that can supplement certain uses of the sensor-based state prediction system 50, as discussed below. The sensor-based state prediction system 50 also processes 170 data from the service records using the unsupervised learning algorithms, as discussed below.

Referring now to FIG. 13, the sensor-based state prediction system 50 includes a geographic proximity risk allocation module 180. Processing 180a has the geographic proximity risk allocation module 180 receive 182 sensor data for each physical object or physical quantity being monitored based on one or more sets of data from the sensors (FIG. 2) or sensor packs (FIG. 16) that are deployed in many premises for many businesses. The sensor-based state prediction system 50 is configured 184 with identities of the premises and the physical objects being monitored by each sensor in each of the identified premises. The sensor-based state prediction system 50 is also configured 186 with numerous recipient systems to which alerts are sent and insurance carrier systems for continuous insurance monitoring, underwriting, and rating of some of the businesses. The sensor-based state prediction system 50 is also configured 188 with geographic location data for each of the premises being monitored and is further configured 190 with geographic information of nearby businesses that are not being monitored by the prediction system 50.

The geographic proximity risk allocation module receives 192 results of the unsupervised learning models executing on the sensor-based state prediction system 50. More particularly the sensor-based state prediction system 50 that monitors for drift states in various physical elements for at least some of the plurality of premises determines 194 existence of such drift states over time. As the analysis determines that signals from one or more sensors have entered a drift state sequence, the sensor-based state prediction system 50 determines 196 a suitable action alert (based on that drift state sequence) to indicate to a user that there may be something wrong with the physical object being monitored.

The sensor-based state prediction system 50 generates from the alerts and state data profiles for each current premises. The sensor-based state prediction system 50 produces for a given premises listings of state sequences that can be safe sequences and unsafe, i.e., drift sequences that can be predicted events, and which result in alerts being sent with suggested actions that the premises' owner should take. The sensor-based state prediction system 50 also tracks resolutions of those anomalies. The sensor-based state prediction system 50 thus produces profiles based on the state sequences for each premises being monitored.

The geographic proximity risk allocation module 180 analyses 200 these profiles for geographic proximity among a group of business. That is, the sensor-based state prediction system 50 determines 202 for a current premises, other premises that are geographically proximate to the current premises. The geographic proximity risk allocation module 180 determines 204 potential effects on the current premises of determined profiles/drift state sequences of the other geographic proximate premises. That is, for a determined profiles/drift state sequences, the geographic proximity risk allocation module 180 (or the sensor-based state prediction system 50 proper) determines whether the determined profiles and/or drift state sequences of one or more of the other geographic proximate premises have any relevance to a risk assessment for the current premises. Principally, this determination is based on examining the state sequence to determine whether the drift state detected is of a type that can have external effects on the current premises or whether the effects that result from the detected drift state would be confined to the one or more geographically proximate premises from which the detected drift state was produced. A second principal determination is based on examining the state sequence to determine whether the drift state detected from the one or more geographically proximate premises, is of a type that is relevant to the type or lines of insurance carried by the current premises. Other determinations can be used. In any event, if so confined, the geographic proximity risk allocation module 180 can skip this drift state.

Based on either the determined profiles and or determined drift states, for determined profiles/drift state sequences that have relevance to the risk assessment of the current premises, the sensor-based state prediction system 50 sends 206 messages to insurance carrier systems to cause rating systems to adjust rates upwards or downwards for the current one (or more) of such premises (insured by such insurance carriers) according to the state sequences generated by the geographic proximity risk allocation module based on state sequences for others of geographically proximate determined premises. That is, by using risk allocation data of customers in geographical proximity to each other, this data in the form of state sequences is used by automated risk assessment system to modify the risk assessments of the current premises and hence insurance rates for the current business.

By geographic proximity is meant as a premises being within a defined physical proximity to another premises and sharing a physical structure. Physical proximity can be bounded in various ways such as with a physical distance, e.g., in a range of 0 feet up to, e.g., 500 feet, but typically can be set in an insurance contract over a longer or shorter range.

For example, an insured, monitored premises can be in a strip mall. This business can be, e.g., a retail clothing store. In the strip mall in this example is also a restaurant that has its kitchen being monitored as per above. The sensor-based state prediction system 50 determines by analyzing the profiles for geographic proximate group of business that this restaurant is not taking proper precautions regarding a monitored piece of equipment. This equipment could be any piece of equipment, for example, an exhaust hood over a grill, which is full of grease or a refrigerator compressor motor that is overheating (because the door does not close properly), etc. The sensor-based state prediction system 50 determines that the kitchen or the hood has entered a drift state based on sensor readings from one or more sensors, (e.g., data from either one or both of sensors that sensor hood temperature or compressor temperature or vibration). Thus, the sensor-based state prediction system 50 has determined that the current conditions now increase the likelihood of a fire originating in the kitchen of that restaurant, thus increasing the likelihood of a fire for all the businesses in that strip mall, including the clothing store. In that case, the sensor-based state prediction system 50 determines that rates should rise for all businesses in that strip mall. When there is a resolution of the anomaly, either as verified or determined manually, or by removal of the drift in the sensors, rates would be readjusted down. If, on the other hand, all businesses in that strip mall are taking proper precautions, then the rates could fall. The risk is assessed collectively when there exists a reasonable connection between the insurable risk posed by one customer that heightens or mitigates impact on the insurable risk of other customers.

This profile data can also be used to build a community that finds similarities between similar establishments. Again using restaurants as an example, the profile data can be used to access how all restaurants for a chain of restaurants rank relative to each other restaurants in the restaurant chain.

Figure 14:
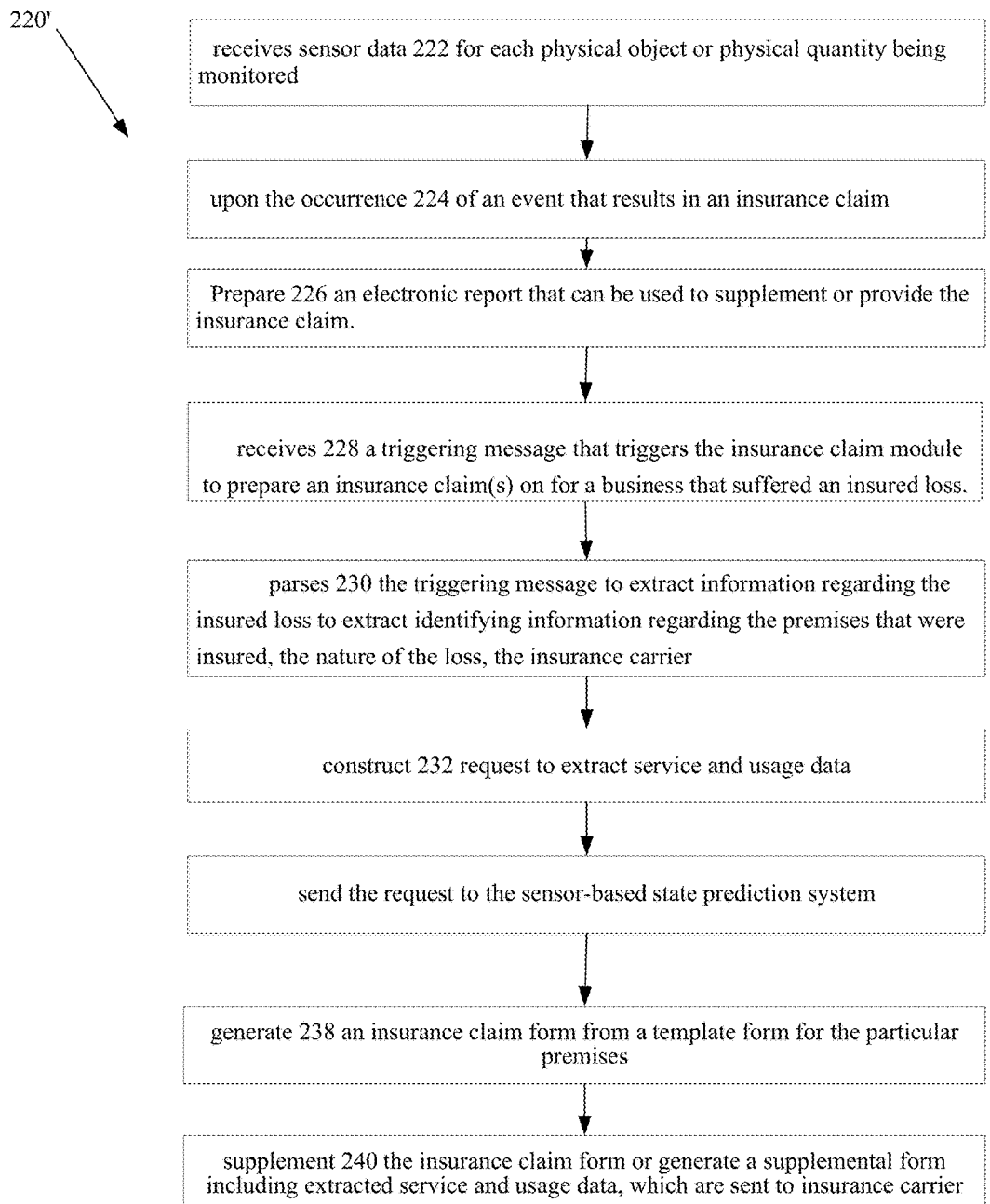
FIG. 14 is a flow diagram of an example of sensor based augmented claim filing.
Figure 16:
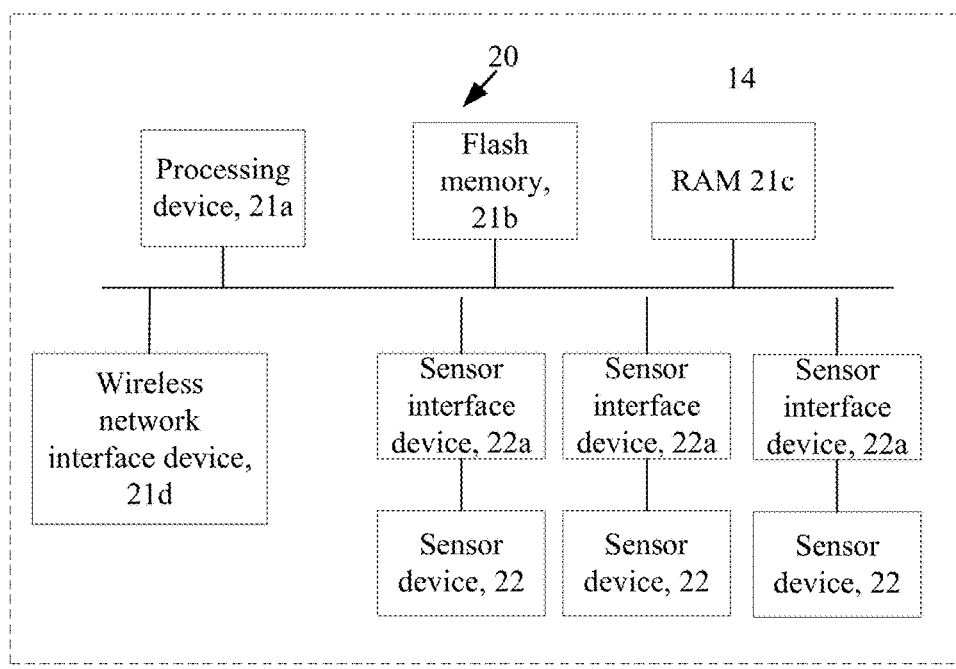
FIG. 16 is a block diagram of a sensor pack.

Referring now to FIG. 14, the augmented claim filing module 220 (FIG. 11) executes processing 220' as shown. The sensor-based state prediction system 50 can be used in conjunction with an insurance claim module to populate and submit an insurance claim or at least supporting documentation upon an occurrence of an insured event. The insurance claim module in the sensor-based state prediction system 50 receives sensor data 222 for each physical object or physical quantity being monitored based on one or more sets of data from sensors (FIG. 2) or sensor packs (FIG. 16). Upon the occurrence 224 of an event that results in an insurance claim, the insurance claim module 226 prepares an electronic report that can be used to supplement or provide the insurance claim.

The insurance claim module receives 228 a triggering message that triggers the insurance claim module to prepare an insurance claim(s) on for a business that suffered an insured loss. The insurance module is triggered by the sensor-based state prediction system 50 detecting a state indicative of a loss or by an owner or owner system starting a insurance claim process. Upon receipt of the triggering message, the insurance claim module parses 230 the triggering message to extract information regarding the insured loss to extract identifying information regarding the premises that were insured, the nature of the loss, the insurance carrier, etc., as well as other generally conventional information.

From this extracted generally conventional information the insurance claim module constructs 232 a request to the sensor-based state prediction system 50 to extract 236 service and usage data for one or more monitored units within the premises, and sends 234 the request to the sensor-based state prediction system 50. In particular, the sensor-based state prediction system 50 extracts service record data for each system within the premises, as well as states of the system/premises prior to the incident and/or actual sensor data of sensors monitoring the system/premises prior to the incident.

The insurance claim module generates 238 an insurance claim form from a template form used by the insurance carrier for the particular premises. The insurance claim module 50 fills in the template with the conventional information such as the policy number, address, policyholder, etc. The insurance claim module however also provides 240 either in the template form or as a supplemental form, the extracted operational data for each specific piece of equipment based upon service and usage records retrieved from the database 51 and sensor states prior to and subsequent to the insured event. The format of this supplemental form can take various configurations. One such configuration is shown in FIG. 14A.

Referring now to FIG. 14A, the populated claim form (or the populated supplemental form, i.e., supporting documentation for the insurance claim form) is populated with the premises and system/equipment ID's and the extracted operational data that shows operational performance of the system/equipment ID before the event and after the event. The populated claim form or the populated supplemental form, also will show whether damaged, monitored systems were running properly, properly serviced etc., based on actual sensor data and historical service record data, as information provided are the actual conditions of the premises as measured by the sensor data and the calculated states as determined by the sensor based prediction system 50 showing the events before the insured event happened and possibly during the insured event. This could benefit customer by yielding more accurate reimbursement of insurance funds depending on the type of insurance coverage. Thus in FIG. 14A a set of records are provided for historical state transitions (several before and during and after event, if any), sensor semantic records, and service records all pertaining to the specific ID equipment/system.

Figure 15:
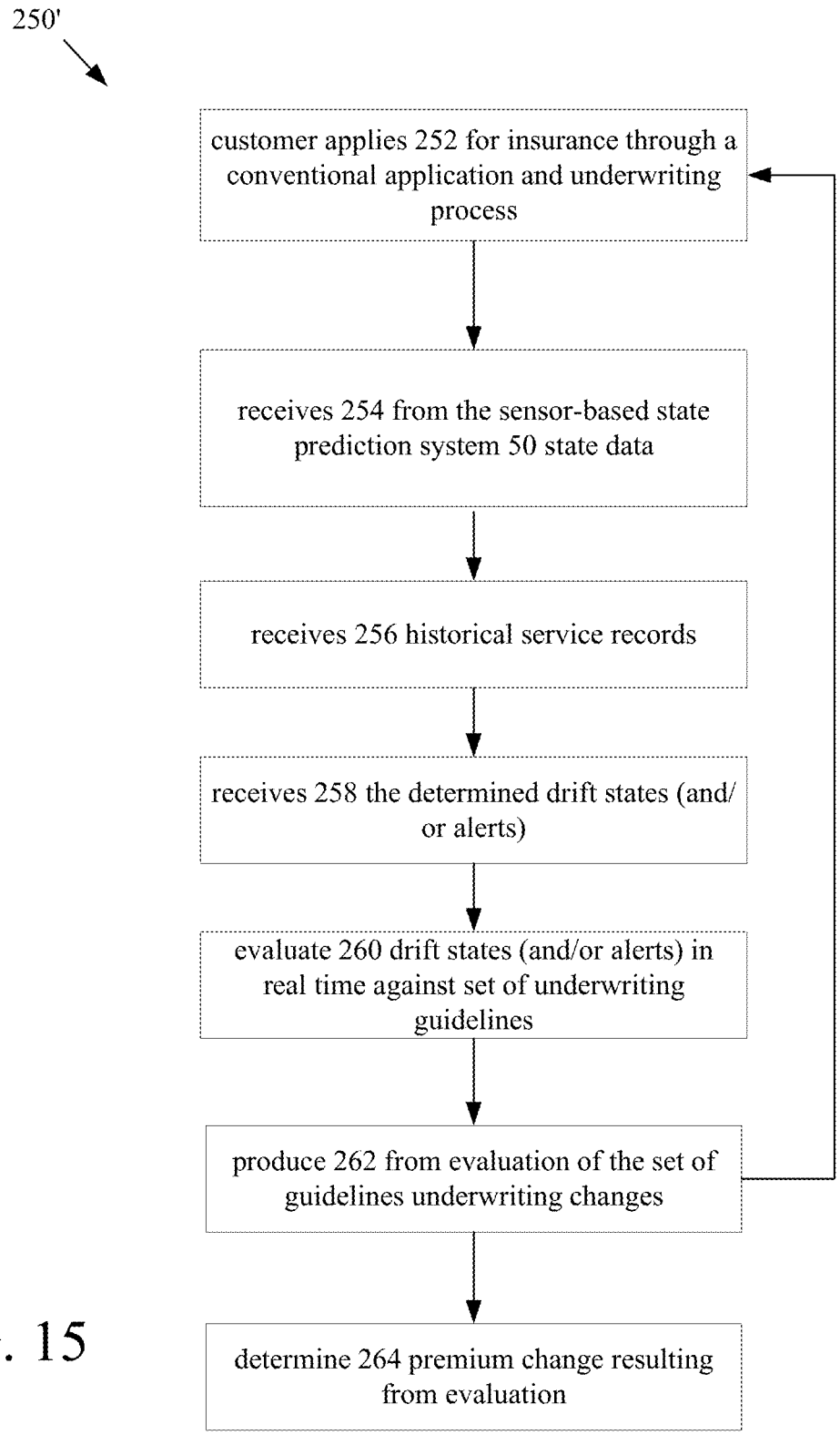
FIG. 15 is a flow diagram of an example of sensor based augmented underwriting

Referring now to FIG. 15, the augmented underwriting module 250 (FIG. 11) executing process 250' for augmenting underwriting of insurance based upon data received from the sensors and service records as described above is shown. The augmented underwriting process 250 is coupled to automated insurance underwriting systems that rate and underwrite insurance policies. Thus, in addition to or rather than merely having a customer fill out an on-line Internet form or paper form for applying for insurance and having that data used to underwrite, without any follow-up, the augmented underwriting insurance process 250 provides a continuous underwriting process for insured premises that verifies states and conditions of insured premises and insured systems/equipment.

The augmented underwriting process starts 252 with a customer applying for insurance through a conventional application and underwriting process. For an exemplary commercial customer, an insurance company issues a policy that insures a commercial premises. The insurance company includes as a term in the policy a provision that allows the insurance company to accept state data from a third party entity system and/or sensor data and service record data that originate at the insured premises from the prediction system 50. The customer premises are configured to supply sensor data to the prediction system 50.

The augmented underwriting process receives 254 from the sensor-based state prediction system 50 that monitors for drift states in various physical elements state data and receives 256 historical service records pertaining to insured equipment and or equipment being monitored.

Overtime, the sensor-based state prediction system 50 collects and analyzes sensor data and collects service record data from the premises. The sensor-based state prediction system 50 monitors the sensor data from plural sensors for drift states in various physical systems for the insured premises, and when sensor-based state prediction system 50 determines existence of drift states, the sensor-based state prediction system 50 determines a suitable action alert (based on that drift state) to indicate to a user that there may be something wrong with the physical object being monitored, as discussed above. The augmented underwriting process receives the determined drift states (and/or alerts) and evaluates 260 these drift states (and/or alerts) in real time against the particular insurance company's unique set of underwriting guidelines.

The automated underwriting system of a typical insurance company encodes that insurance company's underwriting guidelines into a set of underwriting rules. This process uses the augmented underwriting process to augment this automated underwriting process of an insurance company. The augmented underwriting process has a set of augmented underwriting rules that are written based on the insurance companies underwriting guidelines. Using results that are processed from signals of the sensor devices the augmented underwriting process evaluates the set of sensor-based underwriting rules against determined drift states received from the sensor-based state prediction system 50, as well as service records, etc.

The sensor-based underwriting module augments the automated underwriting system used by the insurance company (or underwriting agent for the insurance company). The sensor-based underwriting module can be associated with the sensor-based state prediction system 50 or can generate data that is sent to an insurance company's automated underwriting system. In either event, whether the sensor-based underwriting module augments the automated underwriting system or is associated with the sensor-based state prediction system 50, the sensor-based underwriting module may produce 262 underwriting changes. Underwriting changes, for example would be for conditions that increase risk, as measured by the sensor-based underwriting rules, increases in risk that are translated into increases in premiums. Conversely, for conditions that mitigate or reduce risk, as measured by sensor-based underwriting rules, decreases in risk are translated into either reductions in premiums and/or increases in insured coverage or other added value to the insured.

With any of the above approaches, specific sensor-based underwriting rules are generated for each insured item type and insurance line. These sensor-based underwriting rules are used to supplement the unique underwriting guidelines for an insurance company. These sensor-based underwriting rules are evaluated against the predicted changes in conditions and/or alerts. These sensor-based underwriting rules are evaluated by the underwriting process on a continuous basis to assess on-going risk and exposures of customers based on the generated alert conditions, as measured against the company's unique underwriting guidelines. The underwriting process determines 264 a premium change for the amount of coverage (or conversely could modify the amount of coverage for the premises based on the premium). The underwriting process accomplishes this determination based on a new measure of risk exposure resulting evaluation of the sensor-based underwriting rules based on sensor data/alerts provided from the above-described prediction system 50.

This dynamic underwriting risk analysis can tie alerts to a pricing table (and or a coverage table) that produces percentage increases or decreases in premiums (and/or coverage) according to the insurance carrier's underwriting rules.

The customer acquires insurance coverage for a premises and equipment in the premises. As each insurance company has its own set of underwriting guidelines to determine terms for issuance of the insurance, the information used depends on the type of coverage requested. The guidelines are based on objective factors that insurers use to classify risks, which factors are based on historical experience. With the sensor-based underwriting module either associated with the sensor-based state prediction system 50 or which augments an insurance company's automated underwriting process underwriting risk can be more accurately determined based on predicted actions derived from current sensor readings.

Underwriting in addition to providing a decision whether to accept the risk, the amount of risk that would be accepted and a premium for accepting that amount of risk, underwriting also provides various exclusions that restrict or limit an insurance claim. Two types of categories of exclusion in insurance underwriting are moral hazard and correlated losses. A moral hazard can be considered as a condition where the consequences of the customer's actions are the responsibility of the insurance company rather than the customer. That is by an insurance company insuring for moral hazard that decision can make the customer more likely to take unnecessary risks or actions.

The sensor-based underwriting module can assist insurance to avoid paying for the consequences of reckless behavior by examining alerts that result from such behavior. For example, alerts can constantly be raised for food storage or food preparation issues.

Referring momentarily back to FIG. 2, individual sensor devices were shown. These sensor devices, whether wired or wireless were coupled to the network and provides sensor data for the above applications. A preferred manner for handling sensor monitoring is by use of "sensor packs."

Referring now to FIG. 16, a sensor pack is shown. The concept of a sensor pack uses the processing concepts discussed above in conjunction with FIGS. 5-8, as applied to individual business types and/or individual business areas. In FIG. 16 is shown a specific sensor pack that has three sensor devices. Each of the sensor devices are of different types to sense different physical or thermal or chemical, etc. conditions. In this configuration the sensor pack is pre-configured for a specific business application and specific equipment. In FIG. 16, the three sensors share common infrastructure, i.e., a common processor device 21*a*, e.g., a CPU, (or other type of controller device) that executes under an operating system, generally with 8-bit or 16-bit logic, as mentioned in FIG. 2, a relatively small flash/persistent store 21*b* and volatile memory 21*c*, as discussed above. The device 20 has a wireless network interface card 21*d* that interfaces the device 20 to the network 10. Alternatively, a transceiver chip driven by a wireless network protocol stack (e.g., 802.15.4/6LoWPAN) can be used as the (wireless) network interface. These components are coupled together via a bus structure. The sensor element 22 and a sensor interface 22*a* interface to the processor 21*a*. Sensors 22 can be of any type, but each are of different types, albeit, there can be several sensor of the same type within a pack provided that there are also sensors of different types within that pack.

As defined herein a sensor pack is a pre-packaged group of sensors that have two or more different sensor elements to sense correspondingly two or more different properties, whether those properties are optical, thermal, physical, chemical, etc. parameters. A defined sensor pack is configured according to results of the now to be described risk analysis based on specific business application process.

Figure 17:
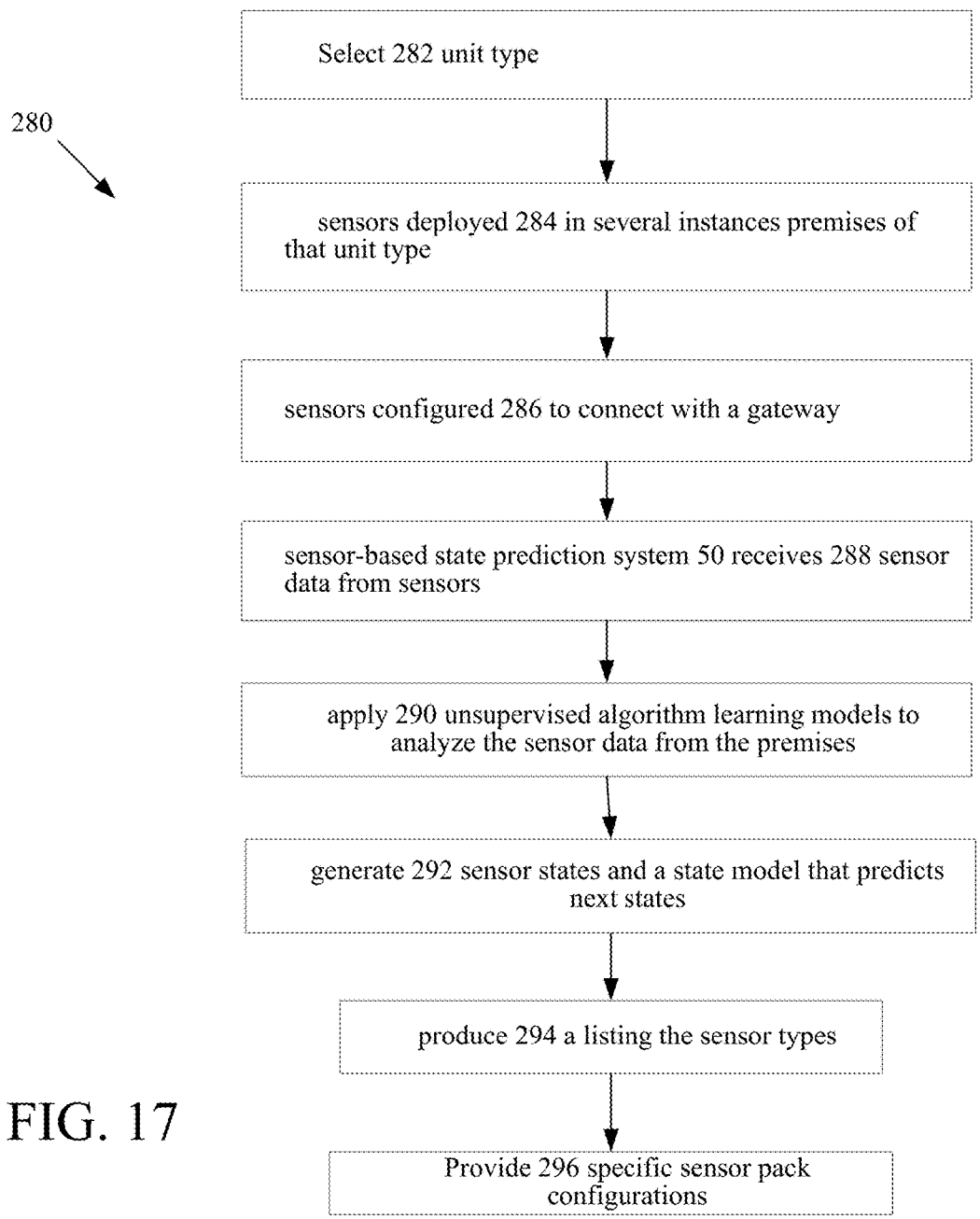
FIG. 17 is a flow diagram of an example process to determine specific configurations of sensor packs for specific applications.

Referring now to FIG. 17, specific configurations of sensor packs are determined depending on the business segment. A process 280 to determine specific sensor packs for specific business units will now be described. The architecture above (FIG. 5) allows collected sensor information to be analyzed by the sensor based prediction system 50. For certain types of units some sensor data may be more relevant to detection of specific anomalies than other sensors units and according to execution of the machine learning algorithms discussed above are more relevant to determine states, whether "safe" (normal) states or unsafe (drift) states. This recognition thus gives rise to the described sensor pack.

Test units at various locations or premises are selected. These test units are existing customer sites of a specific type. For example, two such unit types are restaurant kitchens and warehouses. Within each type there may be sub-types. For example there could be differences between fast food kitchens and higher-end steak houses. In addition, there could be differences between fast food kitchens in a national chain of fast food restaurants and a local mom and pop fast food restaurant. Depending on the sensor type, analysis of data and the need for specific types of sensors will vary greatly.

The process starts 282 with a selection of a unit type. For the selected unit type, sets of sensors are deployed 284 in several premises of that unit type. Within a specific instance of a unit type several sets of different sensors are deployed. Some sensors are deployed to monitor specific types of equipment, whereas other sensors are deployed to monitor the general environment of the unit. For example, sensors can be deployed in a plurality of different kitchens in different restaurants. For a specific kitchen, sensors can be deployed to monitor a plurality of different equipment in the kitchens, e.g., exhaust hoods, refrigeration equipment, ovens, stoves, etc. The sensors are configured 286 to connect with a gateway that sends sensor data from each sensor to the prediction system 50. The types of sensors deployed can be ubiquitous or can be selected based on some pre-existing notion of what kinds of sensors would be most useful for a given business type.

After deployment of the sensors, the sensor-based state prediction system 50 receives 288 sensor data from each of the sensors for each physical object or physical quantity being monitored for each of the instances of the establishments and based on the sets of data from the fixed/mobile sensors (FIG. 2) that are deployed in the premises, the sensor-based state prediction system 50 applies 290 the above mentioned unsupervised algorithm learning models to analyze the sensor data from the premises, which generates 292 sensor states and a state model that can predict Next states, e.g., patterns, anomalies, conditions and events over a time frame that can be expected for the kitchen (generally as described above). The model produces 294 a listing the sensor types that were used in the analysis. This listing determines which sensors most contribute to various predictions and which deployments contribute most to such predictions. The results of this analysis is thus a listing of sensor types for specific deployments and/or a listing of specific deployments (which equipment to monitor and where to place sensors). Based on this testing, application specific types of sensor packs (and/or deployments) are determined for that unit type. The process is repeated for each unit type (or unit sub-type) for which a specific sensor pack configuration for specific a business application is desired.

In addition to producing recommendations on sensor types and deployments the analysis results also include suggested "alerts" that would be generated by the prediction system 50. Various types of premises, in addition to restaurants and warehouses, can be analyzed in this manner including large commercial facilities, such as office buildings, etc. The unsupervised algorithms produce states that are normal or safe states and drift or unsafe states as a self-learning outcome that result from executing such algorithms using the sensor data. The results of execution of these unsupervised algorithms are these sensor states and state sequences for the various units. From these states and state sequences, the sensor-based state prediction system 50 can determine/detect drift states from which predictions and alerts are produced. From this process, different configurations of sensor packs and correspondingly processing and infrastructure to support processing of sensor signals from these sensor packs, are provided 296 for specific unit types.

Figure 18:
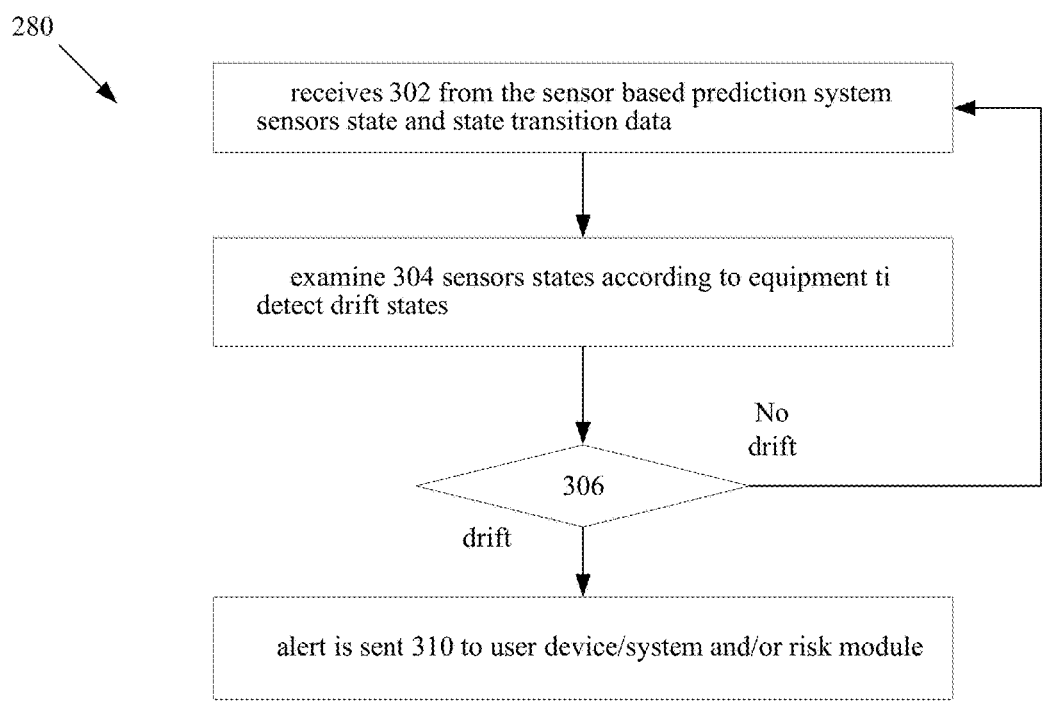
FIG. 18 is a flow diagram of an example of using drift analysis for sensor based predictions of equipment failure.

Referring now to FIG. 18, equipment failure prediction processing 300 is shown. The sensor-based state prediction system 50 by processing the sensor data and service records to determine normal operating ranges in equipment and determining drift information mentioned above can be used to form predictions of when equipment service is coming due or when equipment is about to fail.

The equipment failure prediction processing 300 can be part of the sensor based prediction system 50 that conducts an analysis of sensor signals from deployed individual sensors and/or sensor packs to detect one or more drift states that predict potential equipment failure. As an example, vibration and temperature sensors are used to determine when a particular component is about to fail. Sensor packs are disposed about the premises and either in proximity to high-value equipment that is defined as equipment that is specifically insured or equipment whose failure can result in insured losses or specifically disposed to monitor such high-value equipment.

The equipment failure prediction processing 300 receives 302 from the sensor based prediction system sensors state and state transition data resulting from the processing of FIG. 5, et seq.,) from the sensor packs signals that monitor specific equipment. In the example described, some of these signals can be from the vibration sensor and thermal sensors. The vibration sensors can sense vibrations produced by mechanical equipment, whereas the thermal sensors produce signals proportional to temperatures of such equipment.

The equipment failure prediction processing 300 examines 304 sensors states according to equipment and these states and according to results of the unsupervised learning models, and over time the sensor-based state prediction system 50 detects drift states in the vibration and thermal sensor signals. Based on detecting a drift state or states, the sensor-based state prediction system 50 determines 306 a prediction and a suitable action alert to send to a user device/system.

When a failure is predicted, an alert is sent 310 to the equipment owner to schedule a service call. This failure prediction can also be sent by the sensor-based state prediction system 50 to a sensor-based underwriting module (as discussed above) for either modification of insurance rates or possibly other action such as notice of insurance potential insurance cancelation absent rectification of the alerted condition.

Figure 19:
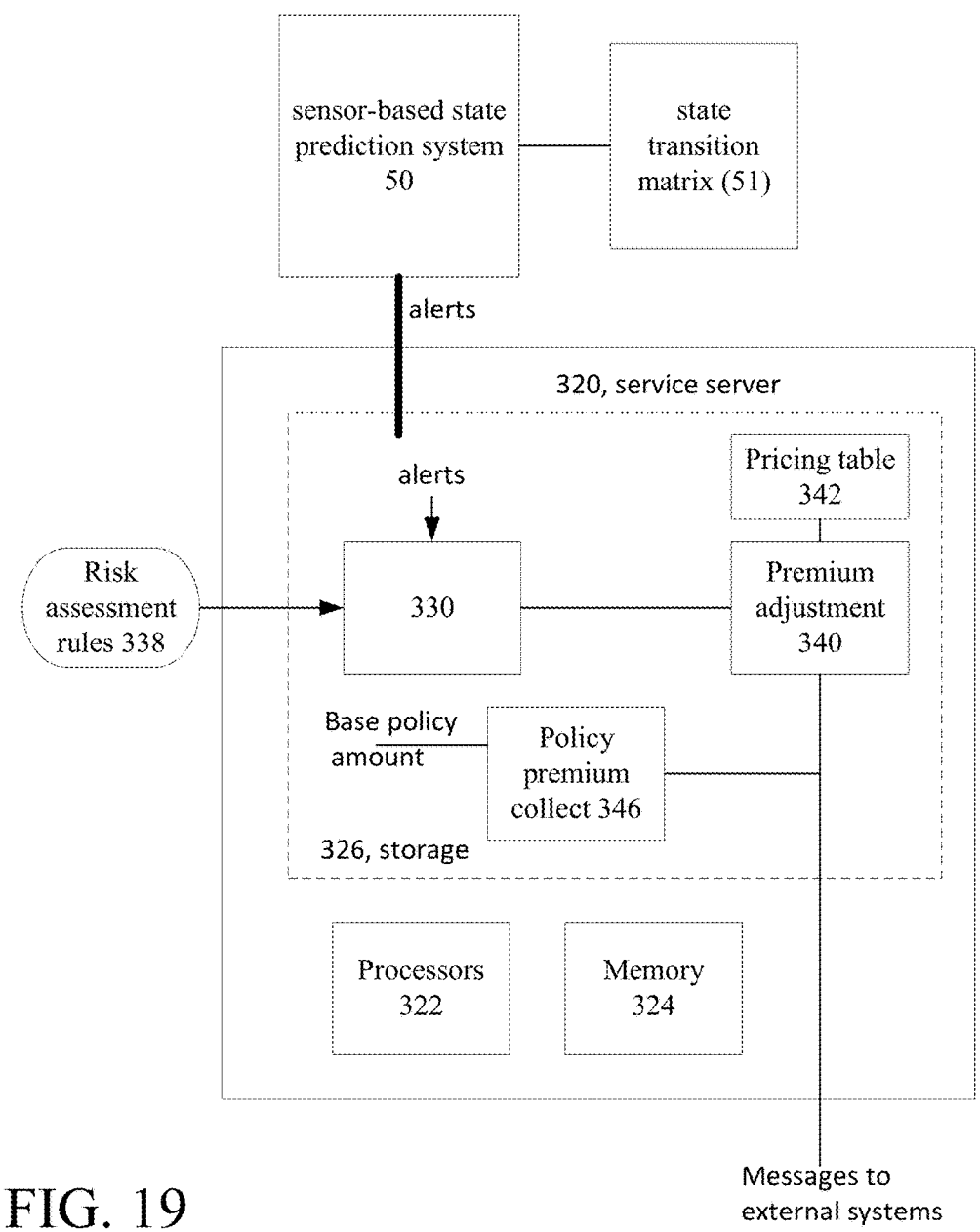
FIG. 19 is a flow diagram of an example of sensor based process for determining risk profile, adjusting insurance premiums and collecting premiums.

Referring now to FIG. 19, a service server 320 for continual adjustment of insurance rates based on analysis of sensor data and continual policy premium aggregation is shown. The service server 320 executes on one or more computer servers that may or may not be part of the "cloud" (FIG. 1) and which receives for a specific premises or a specific group of related premises, sensor states from an associated state transition matrix (e.g., on storage 51) for that specific premises or the specific group of related premises. The service server 320 includes processors 322 coupled to memory 324 and storage 326. The service server 320 is coupled to the sensor-based state prediction system 50 via a network (not shown) to receive alerts generated by sensor-based state prediction system 50. These alerts are messages that result from continuous analysis using the unsupervised learning models in the sensor-based state prediction system 50 that continually monitors for drift states of physical elements and/or premises.

The service server 320 receives alerts include the analysis results of the determined drift states that indicate specific events at the monitored premises (or group of premises). As mentioned, the sensor-based state prediction system 50 also produces suggested actions for the premises owner should be taking with respect to the object being monitored. The suggested actions are tracked by the sensor-based state prediction system 50, as are results of corrective actions taken. One technique for tracking corrective actions is to provide a mechanism through which the premises owner provides proof of the corrective action. Another way to track corrective actions is to infer completion of the corrective action by virtue of states of the premises (or specific equipment) returning to a safe or normal state.

Both the alerts and optionally selected information either the states and/or raw sensor data are sent to a continuous risk assessment and allocation module 330 that is operated by the service server 300. The continuous risk assessment and allocation module 330 determines insurance risk based on the alerts generated from the sensor-based state prediction system, which are evaluated by continuous risk assessment and allocation module 330 with respect to sensor based risk assessment rules 338. The sensor based risk assessment rules 338 can be of various types and are modeled after an insurance carrier's risk factors, but which are modified so as to take into account the dynamic changing conditions at a premises as measured by the alerts, sensor states and drift states.

These alerts are evaluated on a dynamic basis by the continuous risk assessment and allocation module 330. The continuous risk assessment and allocation module 330 parses the alerts to extract semantic information that is evaluated against the risk assessment rules 338 of the insurance carrier to determine increases to risk with respect to existing conditions at the premises as measured by the alerts, sensor states and drift states. Concomitant therewith the continuous risk assessment and allocation module 330 uses the extracted information from the alerts, etc., which is evaluated against the risk assessment rules 338 to determine decreases in risk based on existing conditions at the premises as measured by the alerts, sensor states and drift states. Alerts are evaluated for presence of corrective actions that decrease risk or absence of drift conditions that provide an overall lower risk profile than a previous risk profile (e.g., an initial profile or an older profile).

An example of a particular rule that is a risk assessment rules 338 will now be described. Assume that as part of the underwriting rules of an insurance carrier there is a rule that does not provide insurance coverage or produces a premium increase (per X amount of dollar coverage) to kitchens where there are more than five stoves that produce an aggregate of M British Thermal Units (BTU's) of heat. An exemplary rule that is a risk assessment rules 338 that is sensor based and evaluates a state condition or a drift state against this exemplary assessment rule Rule total BTU<M BTU The sensor based prediction engine 50 forms a state sequence S34 S24 S60. Assume for the example that this sequence indicates that the heat being generated by the stoves in the kitchen exceed M BTU. This rule would be evaluated by the continuous risk assessment and allocation module 330 to modify either coverage or pricing. Thus the assessment rules 338 are based on the carrier's underwriting rules, but modified to use as inputs to the rules, either raw sensor data or state sequences.

These risk changes are sent to a premium adjustment module 340, which converts the risk changes into a value that is used to access a pricing table 342 (or coverage table not shown) and produce a policy premium enhancer amount that is added to (for increases in risk) or subtracted (for decreases in risk) from a base policy premium (or produces a coverage enhancer to modify coverage amounts). The conversion is performed in accordance with assessment rules 338. The policy premium enhancers are adjustment values either positive to increase a premium or negative to decrease a premium that are collected and aggregated by a policy premium collector 346 module.

The policy premium collector 346 module is a structure that periodically credits and debit changes to the policy premium for a particular policy for a particular premises (or group of premises) based on the aforementioned modules 334, 340, 342, etc., and which periodically sends these changes to a policy holder system. The policy premium collector 346 determines an actual amount for the policy at periodic points in time, e.g., monthly, during the term of the policy, and sends messages having these amounts out for delivery to the policy holder for either credit or debit to the policy holder.

Figure 20A:
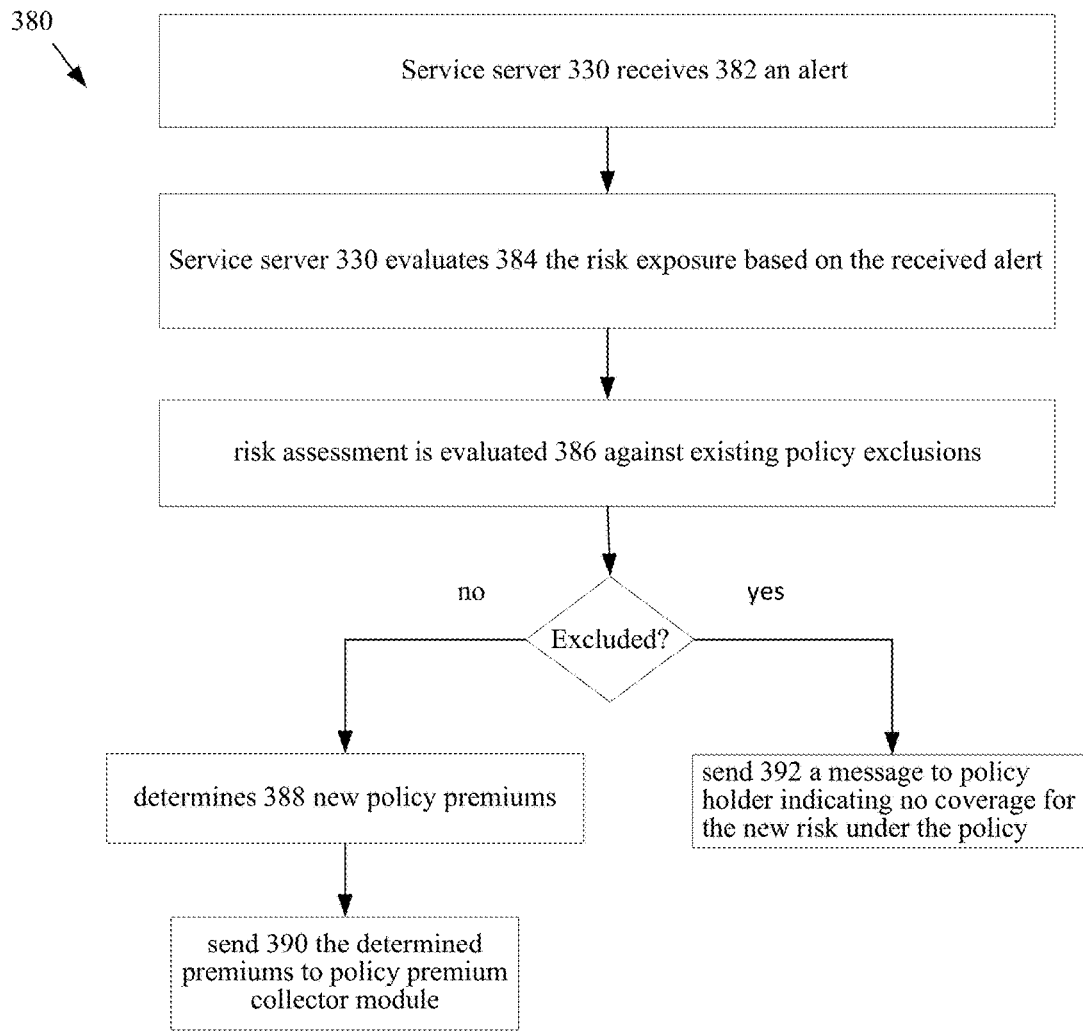
FIGS. 20A and 20B are flow diagrams of examples of processing for FIG. 19.
Figure 20B:
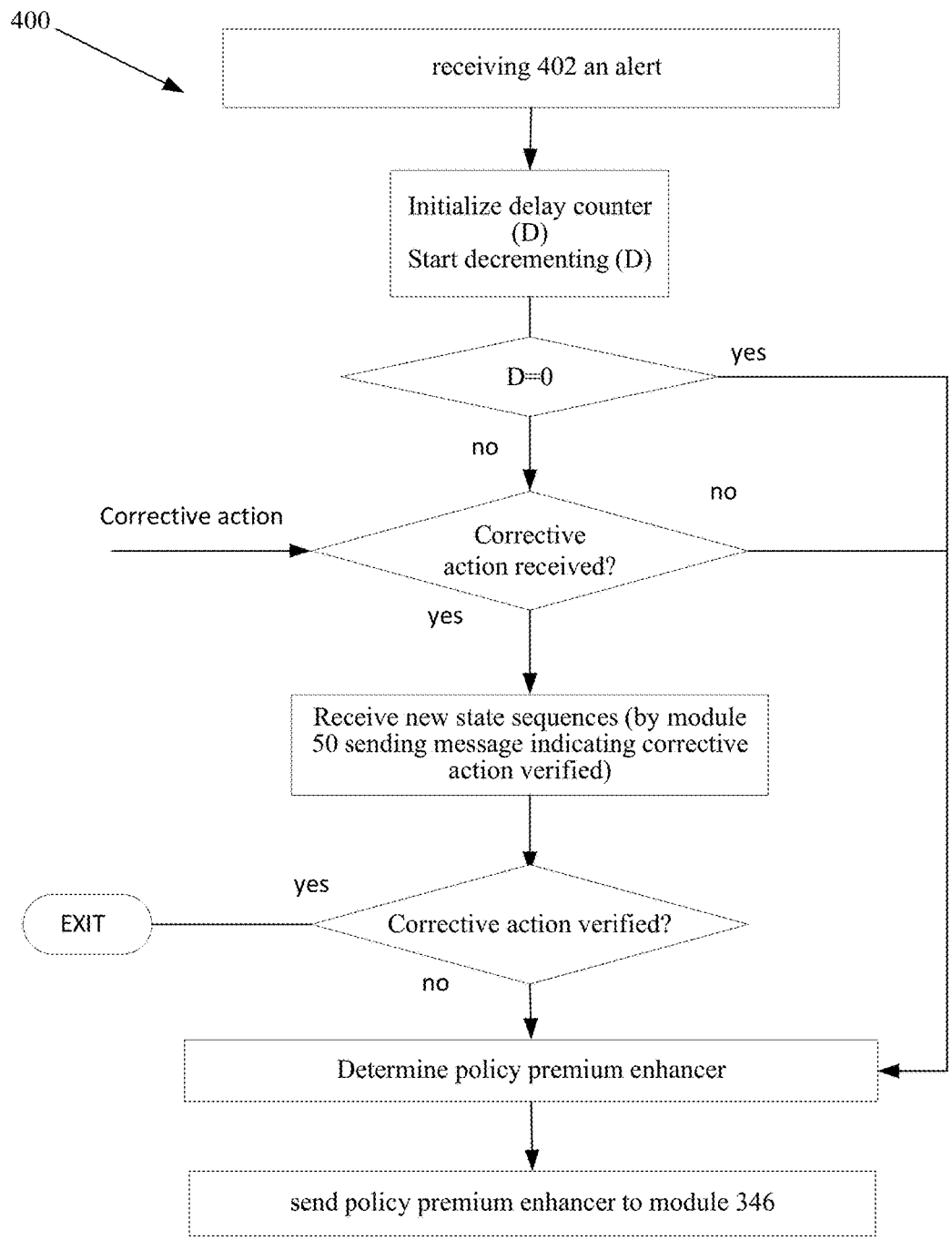

Referring now to FIGS. 20A and 20B, the risk assessment can be a risk assessment that is point in time based (e.g., the single episode discussed above) and/or the risk assessment can be continuous. Generally, there can be two types of risk assessments that are based on a classification of risk. One type, such as the point in time based assessment is a risk assessment that results in an adjustment in premiums contemporaneous with receiving of alert.

As example of the processing 380 performed by the service server 330 for an adjustment in premiums contemporaneous with receiving of alert is shown in FIG. 20A. Service server 330 while rating a warehouse (not shown) receives 382 an alert that indicates that the warehouse is currently storing fireworks or other hazardous materials (as determined by one or more chemical sensors, for instance) for a day or week, but temporally. Upon receipt of the alert, the alert is parsed to provide a semantic indicator that is used in evaluation 384 of the risk exposure for the facility presented with the new alert. That is, based on the alert, a new risk assessment is determined and concomitant therewith this new risk assessment is evaluated 386 against existing policy exclusions to determine whether the new risk assessment is within the policy coverage or whether it is excluded. The service server 300 determines 388 new policy premiums for that policy (e.g., via modules 340 and 342 FIG. 19) when the new risk assessment is within the policy coverage and sends 390 the determined premiums to the policy premium collector module 346, whereas when the service server determines that the new risk assessment is for an existing policy exclusion, the service server sends 392 a message to the policy holder indicating that there is no coverage for the new risk under the policy based on exclusion terms of the policy.

The new policy premiums for the policy when the new risk assessment is within the policy coverage are determined by accessing the policy pricing table that stores policy premium enhancers (changes in premiums per base amount of coverage) as discussed above.

As shown in FIG. 20B, a second type of classification of risk is a type where upon receipt of the alert, the carrier delays charging of new premiums giving the policy holder time to correct the conditions that caused determination of the alert. In this instance, the processing 400 performed by the service server 300 includes receiving 402 an alert either the new risk assessment is determined and evaluated to determine a new premium enhancer generally as discussed above (which assessment is delayed) or the determination is delayed. The delay is for a set amount of time/days to enable corrective action by the owner. In any event, upon expiration of the set delay period (fixed in the policy) if no corrective action has been taken, the policy premium enhancer is applied. Corrective action is verified by receipt by service server 300 of state messages indicating that the premises has re-entered a safe or normal state.

The service server 300 receives various policy premium enhancers for that policy based on new risk assessments and corrections to risk assessments, and determines new policy premiums and sends the determined new premiums to the policy premium collector module 346 that sends the new policy premium charges to the policy holder on a periodic bases along with reports showing application of the policy enhancers based on received states.

Various combinations of the above described processes are used to implement the features described.

Servers interface to the sensor based state prediction system 50 via a cloud computing configuration and parts of some networks can be run as sub-nets. In some embodiments, the sensors provide in addition to sensor data, detailed additional information that can be used in processing of sensor data evaluate. For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Program instructions stored in the memory, along with configuration data may control overall operation of the system. Servers include one or more processing devices (e.g., microprocessors), a network interface and a memory (all not illustrated). Servers may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer program product tangibly stored on a non-transitory computer readable hardware storage device, the computer program product for determining a sensor set for a given type of premises, the computer program product comprising instructions to cause a processor to:
   collect sensor information from a plurality of groups of different types of sensors deployed in a plurality of different types of premises, with the sensor information including sensor data, sensor identity information and premises identification information:
   convert the sensor information for each sensor into semantic representations of a state of a corresponding premises;
   produce operational states from the sensor information for the plurality of different types of premises;
   produce sequences of state transitions from the operational states;
   execute one or more unsupervised learning models that analyze the semantic representations and the operational states to determine from the sensor information for each of the groups of different types of sensors a prediction of an immediate next operational states;
   for a prediction of an unsafe operational state,
   determine empirically, characteristics of each of the plurality of different types of premises occurring during a determined unsafe operational state;
   produce alerts based on the determined unsafe operational state;
   determine from the operational states which of the sensors in the groups of different types of sensors contributed to the alerts for each of the plurality of different types of premises and for a given type of premises selected from the plurality of different types of premises,
   determine a set of sensors for use in detecting conditions at other premises of a type corresponding to the given type of premises.

2. The computer program product of claim 1, wherein the computer program product further comprises instructions to cause the processor to:
   classify the set of sensors as a sensor pack for the premises type corresponding to the given type of premises.

3. The computer program product of claim 2 wherein a specific configuration of the sensor pack is determined for a business segment for the given type of premises.

4. The computer program product of claim 1 wherein for each of the plurality of different types of premises, the program determines which sensor information is more relevant to detection of specific anomalies than other sensor information according to execution of a machine learning unsupervised algorithms.

5. The computer program product of claim 1 wherein the computer program receives sensor information from the groups of sensors for a specific type of the plural premises and the computer program product further comprises instructions to cause the processor to:
   determine which of the groups of sensors are relevant for specific types of equipment; and
   determine which of the groups of sensors are relevant for monitoring the plurality of different types of premises.

6. A system comprises:
   plural groups of sensors, each group comprised of plural different types of sensors to sense plural different physical chemical and optical properties, with the plural groups of sensors installed at a plurality of different types of premises:
   a gateway at each premises to couple each of the plural groups of sensors to a network;
   a server computer comprising processor and memory, the server computer coupled to the network;
   a non-transitory storage device storing a computer program product for detecting conditions at each of the plurality of different types of premises, the computer program product comprising instructions to cause the server to:

collect sensor information from the plural groups of sensors, with the collected sensor information including sensor data, sensor identity information and premises identification information;

convert the collected sensor information for each sensor into a semantic representations of a state of a corresponding premises;

produce operational states from the sensor information for the plurality of different types of premises;

produce sequences of state transitions from the operational states;

assign labels to the produced operational states;

execute one or more unsupervised learning models that analyze the semantic representations and the produced operational states to determine for each of the different types of premises from the collected sensor information for each of the plural groups of sensor devices, a prediction of an immediate next operational state;

for a prediction of an unsafe operational state,
determine empirically, characteristics of each premises occurring during a determined unsafe operational state;
produce alerts based on the determined unsafe operational state;
determine from produced operational states which sensors in the plural groups of sensors contributed to the produced alerts for each of the different types of premises; and for a given type of premises selected from the plurality of different types of premises,
determine a set of sensors for use in detecting conditions at other premise of a type corresponding to the given type of premises.

7. The system of claim 6 wherein the computer program product further comprises instructions to:
classify the determined set of sensors as a sensor pack for the premises type corresponding to the given type of premises.

8. The system of claim 7 wherein a specific configuration of sensor packs is determined for a business segment for the given type of premises.

9. The system of claim 6 wherein for each business segment the program determines which sensor information is more relevant to detection of specific anomalies than other sensor information according to execution of a machine learning unsupervised algorithms.

10. The system of claim 6 wherein the computer program receives sensor information from a plural groups of sensors for a specific instance of the plurality of different types of premises, and the computer program product further comprises instructions to:
determine which of the plural groups of sensors are relevant for specific types of equipment; and
determine which of the plural groups of sensors are relevant for monitoring the plurality of different types of premises.

11. A computer implemented method comprises:
collecting sensor information from a plural groups of sensors that are comprised of plural different types of sensors, and which groups of sensors are deployed in a plurality of different types of premises, with the collected sensor information including sensor data, sensor identity information and premises identification information;

sending by each of plural gateways, the collected sensor information to one or more server computers that comprise processor devices and memory;

converting the collected sensor information for each sensor into a semantic representations of a state of a corresponding premises;

producing operational states from the sensor information for the plurality of different types of premises;

producing by the one or more server computers sequences of state transitions from the operational states;

assigning labels to the produced operational states;

executing by the one or more server computers, one or more unsupervised learning models that analyze the semantic representations and the produced operational states to determine for the plurality of different types of premises from the collected sensor information for each of the plural groups of sensors, a prediction of an immediate next operational state; for a prediction of unsafe operational state, determining empirically, characteristics of each of the plurality of different types of premises occurring during a determined unsafe operational states;

producing, by the one or more server computers, alerts based on the determined unsafe operational states;

determining by the one or more server computers from the produced operational states which of the plural groups of sensors contribute to the produced alerts for the plurality of different types of premises; and for a given premises type selected from the plurality of different types of premises, determining by the one or more server computers, a set of sensors for use in detecting conditions at other premises of a type corresponding to the given premises type.

12. The method of claim 11 further comprising:
classifying by the one or more server computers the determined set of sensors as a sensor pack for the premises type corresponding to the given premises type.

13. The method of claim 12 wherein a specific configuration of sensor packs is determined for a business segment for the given premises type.

14. The method of claim 11, further comprising:
determining by the one or more server computers for the plurality of different types of premises, which sensor information is more relevant to detection of specific anomalies than other sensor information according to execution of a machine learning unsupervised algorithms.

15. The method of claim 11 further comprising:
determining by the one or more server computers which of the plural groups of sensors are relevant for specific types of equipment; and
determining by the one or more server computers which of the plural groups of sensors are relevant for monitoring the plurality of different types of premises.

* * * * *